United States Patent
Giraud et al.

(10) Patent No.: US 8,660,397 B2
(45) Date of Patent: Feb. 25, 2014

(54) MULTI-LAYER MODULE

(75) Inventors: William J. Giraud, Azle, TX (US); Michael H. Rasmussen, Keller, TX (US); Diana Rodriguez, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 168 days.

(21) Appl. No.: 12/956,475

(22) Filed: Nov. 30, 2010

(65) Prior Publication Data

US 2011/0268414 A1 Nov. 3, 2011

Related U.S. Application Data

(60) Provisional application No. 61/330,162, filed on Apr. 30, 2010.

(51) Int. Cl.
*G02B 6/46* (2006.01)

(52) U.S. Cl.
USPC .......................................................... 385/135

(58) Field of Classification Search
USPC ................................................. 385/134, 135
See application file for complete search history.

(56) References Cited

U.S. PATENT DOCUMENTS

| | | | |
|---|---|---|---|
| 620,013 A | 2/1899 | Barnes | |
| 2,614,685 A | 10/1952 | Miller | |
| 3,175,873 A | 3/1965 | Blomquist et al. | |
| 3,212,192 A | 10/1965 | Bachmann et al. | |
| 3,433,886 A | 3/1969 | Myers | |
| 3,568,263 A | 3/1971 | Meehan | |
| 3,646,244 A | 2/1972 | Cole | |
| 3,880,396 A | 4/1975 | Freiberger et al. | |
| 3,906,592 A | 9/1975 | Sakasegawa et al. | |
| 4,047,797 A | 9/1977 | Arnold et al. | |
| 4,059,872 A | 11/1977 | Delesandri | |
| 4,119,285 A | 10/1978 | Bisping et al. | |
| 4,239,316 A | 12/1980 | Spaulding | |
| 4,285,486 A | 8/1981 | Von Osten et al. | |
| 4,354,731 A | 10/1982 | Mouissie | |

(Continued)

FOREIGN PATENT DOCUMENTS

| | | |
|---|---|---|
| CA | 2029592 A1 | 5/1992 |
| CA | 2186314 A1 | 4/1997 |

(Continued)

OTHER PUBLICATIONS

Final Office Action for U.S. Appl. No. 12/394,114 mailed Oct. 25, 2012, 8 pages.

(Continued)

*Primary Examiner* — Sarah Hahm

(57) ABSTRACT

A multi-layer module that includes a multi-fiber cable storage layer having a cable entry opening and a cable winding structure is disclosed. Also included is a splice storage layer that is discrete from the multi-fiber cable storage layer, the splice storage layer having a splice layer receiving opening in communication with the multi-fiber cable storage layer and a slack storage area. The multi-layer module includes a pigtail storage layer that is discrete from both the multi-fiber cable storage layer and the splice storage layer, the pigtail storage layer having a pigtail connector area and a pigtail storage area, the pigtail storage area comprising a pigtail storage layer receiving opening in communication with the splice storage layer.

7 Claims, 15 Drawing Sheets

(56) References Cited

U.S. PATENT DOCUMENTS

| | | | |
|---|---|---|---|
| 4,457,482 A | 7/1984 | Kitagawa |
| 4,525,012 A | 6/1985 | Dunner |
| 4,597,173 A | 7/1986 | Chino et al. |
| 4,611,875 A | 9/1986 | Clarke et al. |
| 4,645,292 A | 2/1987 | Sammueller |
| 4,657,340 A | 4/1987 | Tanaka et al. |
| 4,702,551 A | 10/1987 | Coulombe |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,787,706 A | 11/1988 | Cannon, Jr. et al. |
| 4,792,203 A | 12/1988 | Nelson et al. |
| 4,798,432 A | 1/1989 | Becker et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,731 A | 12/1993 | White |
| 5,280,138 A | 1/1994 | Preston et al. |
| 5,285,515 A | 2/1994 | Milanowski et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith ............................ 385/135 |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,438,641 A | 8/1995 | Malacame |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. ............. 385/135 |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |

(56) References Cited

U.S. PATENT DOCUMENTS

| | | |
|---|---|---|
| 5,694,511 A | 12/1997 | Pimpinella et al. |
| 5,701,380 A | 12/1997 | Larson et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,758,003 A | 5/1998 | Wheeler et al. |
| 5,758,004 A | 5/1998 | Alarcon et al. |
| 5,761,026 A | 6/1998 | Robinson et al. |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. .................... 385/134 |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams |
| 6,212,324 B1 | 4/2001 | Lin et al. |
| 6,215,938 B1 | 4/2001 | Reitmeier et al. |
| 6,227,717 B1 | 5/2001 | Ott et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,263,141 B1 | 7/2001 | Smith |
| 6,265,680 B1 | 7/2001 | Robertson |
| 6,269,212 B1 | 7/2001 | Schiattone |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,292,614 B1 | 9/2001 | Smith et al. |
| 6,301,424 B1 | 10/2001 | Hwang |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,325,549 B1 | 12/2001 | Shevchuk |
| RE37,489 E | 1/2002 | Anton et al. |
| 6,343,313 B1 | 1/2002 | Salesky et al. |
| 6,347,888 B1 | 2/2002 | Puetz |
| 6,353,696 B1 | 3/2002 | Gordon et al. |
| 6,353,697 B1 | 3/2002 | Daoud |
| 6,359,228 B1 | 3/2002 | Strause et al. |
| 6,363,200 B1 | 3/2002 | Thompson et al. |
| 6,370,309 B1 | 4/2002 | Daoud |
| 6,377,218 B1 | 4/2002 | Nelson et al. |
| 6,379,052 B1 | 4/2002 | De Jong et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |

(56) References Cited

U.S. PATENT DOCUMENTS

| | | |
|---|---|---|
| 6,539,147 B1 | 3/2003 | Mahony |
| 6,539,160 B2 | 3/2003 | Battey et al. |
| 6,542,688 B1 | 4/2003 | Battey et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 | 7/2003 | Spence et al. |
| 6,588,938 B1 | 7/2003 | Lampert et al. |
| 6,591,051 B2 | 7/2003 | Solheid et al. |
| 6,592,266 B1 | 7/2003 | Hankins et al. |
| 6,597,670 B1 | 7/2003 | Tweedy et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,701,056 B2 | 3/2004 | Burek et al. .................. 385/137 |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B2 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,934,451 B2 | 8/2005 | Cooke |
| 6,934,456 B2 | 8/2005 | Ferris et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,128,471 B2 | 10/2006 | Wilson |
| 7,139,462 B1 | 11/2006 | Richtman |
| 7,171,099 B2 | 1/2007 | Barnes et al. |
| 7,171,121 B1 | 1/2007 | Skarica et al. |
| 7,181,142 B1 | 2/2007 | Xu et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,220,065 B2 | 5/2007 | Han et al. |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. ............... 385/135 |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |

(56) References Cited

U.S. PATENT DOCUMENTS

| | | | |
|---|---|---|---|
| 7,300,308 B2 | 11/2007 | Laursen et al. | |
| 7,302,149 B2 | 11/2007 | Swam et al. | |
| 7,302,153 B2 | 11/2007 | Thom | |
| 7,302,154 B2 | 11/2007 | Trebesch et al. | |
| 7,308,184 B2 | 12/2007 | Barnes et al. | |
| 7,310,471 B2 | 12/2007 | Bayazit et al. | |
| 7,310,472 B2 | 12/2007 | Haberman | |
| 7,315,681 B2 | 1/2008 | Kewitsch | |
| 7,325,975 B2 | 2/2008 | Yamada et al. | |
| 7,330,625 B2 | 2/2008 | Barth | |
| 7,330,626 B2 | 2/2008 | Kowalczyk et al. | |
| 7,330,629 B2 | 2/2008 | Cooke et al. | |
| 7,331,718 B2 | 2/2008 | Yazaki et al. | |
| 7,340,145 B2 | 3/2008 | Allen | |
| 7,349,615 B2 | 3/2008 | Frazier et al. | |
| 7,373,071 B2 | 5/2008 | Douglas et al. | |
| 7,376,321 B2 | 5/2008 | Bolster et al. | |
| 7,376,323 B2 | 5/2008 | Zimmel | |
| 7,391,952 B1 | 6/2008 | Ugolini et al. | |
| 7,397,996 B2 | 7/2008 | Herzog et al. | |
| 7,400,813 B2 | 7/2008 | Zimmel | |
| 7,409,137 B2 | 8/2008 | Barnes | |
| 7,414,198 B2 | 8/2008 | Stansbie et al. | |
| 7,417,188 B2 | 8/2008 | McNutt et al. | |
| 7,418,182 B2 | 8/2008 | Krampotich | |
| 7,418,184 B1 | 8/2008 | Gonzales et al. | |
| 7,421,182 B2 | 9/2008 | Bayazit et al. | |
| 7,428,363 B2 | 9/2008 | Leon et al. | |
| 7,437,049 B2 | 10/2008 | Krampotich | |
| 7,439,453 B2 | 10/2008 | Murano et al. | |
| 7,454,113 B2 | 11/2008 | Barnes | |
| 7,460,757 B2 | 12/2008 | Hoehne et al. | |
| 7,460,758 B2 | 12/2008 | Xin | |
| 7,461,981 B2 | 12/2008 | Yow, Jr. et al. | |
| 7,462,779 B2 | 12/2008 | Caveney et al. | |
| 7,463,810 B2 | 12/2008 | Bayazit et al. | |
| 7,463,811 B2 | 12/2008 | Trebesch et al. | |
| 7,469,090 B2 | 12/2008 | Ferris et al. | |
| 7,471,867 B2 | 12/2008 | Vogel et al. | |
| 7,474,828 B2 | 1/2009 | Leon et al. | |
| 7,477,824 B2 | 1/2009 | Reagan et al. | |
| 7,477,826 B2 | 1/2009 | Mullaney et al. | |
| 7,480,438 B2 | 1/2009 | Douglas et al. | |
| 7,488,205 B2 | 2/2009 | Spisany et al. | |
| 7,493,002 B2 | 2/2009 | Coburn et al. | |
| 7,496,269 B1 | 2/2009 | Lee | |
| 7,499,622 B2 | 3/2009 | Castonguay et al. | |
| 7,499,623 B2 | 3/2009 | Barnes et al. | |
| 7,507,111 B2 | 3/2009 | Togami et al. | |
| 7,509,015 B2 | 3/2009 | Murano | |
| 7,509,016 B2 | 3/2009 | Smith et al. | |
| 7,522,804 B2 | 4/2009 | Araki et al. | |
| 7,526,171 B2 | 4/2009 | Caveney et al. | |
| 7,526,172 B2 | 4/2009 | Gniadek et al. | |
| 7,526,174 B2 | 4/2009 | Leon et al. | |
| 7,529,458 B2 | 5/2009 | Spisany et al. | |
| 7,534,958 B2 | 5/2009 | McNutt et al. | |
| 7,536,075 B2 | 5/2009 | Zimmel | |
| 7,542,645 B1 | 6/2009 | Hua et al. | |
| 7,555,193 B2 | 6/2009 | Rapp et al. | |
| 7,558,458 B2 | 7/2009 | Gronvall et al. | |
| 7,565,051 B2 | 7/2009 | Vongseng | |
| 7,567,744 B2 | 7/2009 | Krampotich et al. | |
| 7,570,860 B2 | 8/2009 | Smrha et al. | |
| 7,570,861 B2 | 8/2009 | Smrha et al. | |
| 7,577,331 B2 | 8/2009 | Laurisch et al. | |
| 7,603,020 B1 | 10/2009 | Wakileh et al. | |
| 7,607,938 B2 | 10/2009 | Clark et al. | |
| 7,609,967 B2 | 10/2009 | Hochbaum et al. | |
| 7,613,377 B2 | 11/2009 | Gonzales et al. | |
| 7,620,272 B2 | 11/2009 | Hino et al. | |
| 7,620,287 B2 | 11/2009 | Appenzeller et al. | |
| 7,641,398 B2 | 1/2010 | O'Riorden et al. | |
| 7,668,430 B2 | 2/2010 | McClellan et al. | |
| 7,668,433 B2 | 2/2010 | Bayazit et al. | |
| 7,672,561 B1 | 3/2010 | Keith et al. | |
| 7,676,135 B2 | 3/2010 | Chen | |
| 7,697,811 B2 | 4/2010 | Murano et al. | |
| 7,715,125 B2 | 5/2010 | Willey | |
| 7,715,683 B2 | 5/2010 | Kowalczyk et al. | |
| 7,740,409 B2 | 6/2010 | Bolton et al. | |
| 7,743,495 B2 | 6/2010 | Mori et al. | |
| 7,751,674 B2 | 7/2010 | Hill | 385/135 |
| 7,751,675 B2 | 7/2010 | Holmberg et al. | 385/135 |
| 7,756,382 B2 | 7/2010 | Saravanos et al. | |
| 7,760,984 B2 | 7/2010 | Solheid et al. | |
| 7,764,858 B2 | 7/2010 | Bayazit et al. | |
| 7,764,859 B2 | 7/2010 | Krampotich et al. | 385/135 |
| 7,805,044 B2 | 9/2010 | Reagan et al. | 385/135 |
| 7,809,235 B2 | 10/2010 | Reagan et al. | |
| 7,822,310 B2 | 10/2010 | Castonguay et al. | |
| 7,850,372 B2 | 12/2010 | Nishimura et al. | |
| 7,853,112 B2 | 12/2010 | Zimmel et al. | |
| 7,856,166 B2 | 12/2010 | Biribuze et al. | |
| 7,914,332 B2 | 3/2011 | Song et al. | |
| 7,942,589 B2 | 5/2011 | Yazaki et al. | |
| 7,945,135 B2 | 5/2011 | Cooke et al. | |
| 7,945,136 B2 | 5/2011 | Cooke et al. | |
| 7,945,138 B2 | 5/2011 | Hill et al. | 385/135 |
| 7,970,250 B2 | 6/2011 | Morris | |
| 8,014,171 B2 | 9/2011 | Kelly et al. | |
| 8,014,646 B2 | 9/2011 | Keith et al. | |
| 8,020,813 B1 | 9/2011 | Clark et al. | |
| 8,059,932 B2 | 11/2011 | Hill et al. | 385/135 |
| 8,107,785 B2 | 1/2012 | Berglund et al. | |
| 8,206,058 B2 | 6/2012 | Vrondran et al. | |
| 8,537,477 B2 | 9/2013 | Shioda | |
| 2001/0010741 A1 | 8/2001 | Hizuka | |
| 2001/0029125 A1 | 10/2001 | Morita et al. | |
| 2002/0010818 A1 | 1/2002 | Wei et al. | |
| 2002/0012353 A1 | 1/2002 | Gerszberg et al. | |
| 2002/0034290 A1 | 3/2002 | Pershan | |
| 2002/0037139 A1 | 3/2002 | Asao et al. | |
| 2002/0064364 A1 | 5/2002 | Battey et al. | |
| 2002/0131730 A1 | 9/2002 | Keeble et al. | |
| 2002/0136519 A1 | 9/2002 | Tinucci et al. | |
| 2002/0141724 A1 | 10/2002 | Ogawa et al. | |
| 2002/0150372 A1 | 10/2002 | Schray | |
| 2002/0172467 A1 | 11/2002 | Anderson et al. | |
| 2002/0181918 A1 | 12/2002 | Spence et al. | |
| 2002/0181922 A1 | 12/2002 | Xin et al. | |
| 2002/0194596 A1 | 12/2002 | Srivastava | |
| 2003/0007743 A1 | 1/2003 | Asada | |
| 2003/0007767 A1 | 1/2003 | Douglas et al. | |
| 2003/0021539 A1 | 1/2003 | Kwon et al. | |
| 2003/0066998 A1 | 4/2003 | Lee | |
| 2003/0086675 A1 | 5/2003 | Wu et al. | |
| 2003/0095753 A1 | 5/2003 | Wada et al. | |
| 2003/0147604 A1 | 8/2003 | Tapia et al. | |
| 2003/0174996 A1 | 9/2003 | Henschel et al. | |
| 2003/0180012 A1 | 9/2003 | Deane et al. | |
| 2003/0183413 A1 | 10/2003 | Kato | |
| 2003/0199201 A1 | 10/2003 | Mullaney et al. | |
| 2003/0210882 A1 | 11/2003 | Barthel et al. | |
| 2003/0223723 A1 | 12/2003 | Massey et al. | |
| 2003/0235387 A1 | 12/2003 | Dufour | |
| 2004/0013389 A1 | 1/2004 | Taylor | |
| 2004/0013390 A1 | 1/2004 | Kim et al. | |
| 2004/0074852 A1 | 4/2004 | Knudsen et al. | |
| 2004/0086238 A1 | 5/2004 | Finona et al. | |
| 2004/0086252 A1 | 5/2004 | Smith et al. | |
| 2004/0147159 A1 | 7/2004 | Urban et al. | |
| 2004/0151465 A1 | 8/2004 | Krampotich et al. | |
| 2004/0175090 A1 | 9/2004 | Vastmans et al. | |
| 2004/0192115 A1 | 9/2004 | Bugg | |
| 2004/0208459 A1 | 10/2004 | Mizue et al. | |
| 2004/0228598 A1 | 11/2004 | Allen et al. | |
| 2004/0240882 A1 | 12/2004 | Lipski et al. | |
| 2004/0264873 A1 | 12/2004 | Smith et al. | |
| 2005/0002633 A1 | 1/2005 | Solheid et al. | |
| 2005/0008131 A1 | 1/2005 | Cook | |
| 2005/0026497 A1 | 2/2005 | Holliday | |
| 2005/0036749 A1 | 2/2005 | Vogel et al. | |
| 2005/0074990 A1 | 4/2005 | Shearman et al. | |

(56) References Cited

U.S. PATENT DOCUMENTS

| | | |
|---|---|---|
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0281527 A1 | 12/2005 | Wilson et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0131628 A1 | 6/2007 | Mimlitch, III et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. .......... 385/135 |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. .......... 385/135 |
| 2009/0097813 A1 | 4/2009 | Hill |
| 2009/0136194 A1 | 5/2009 | Barnes |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Sheau et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. ......... 385/129 |
| 2009/0269018 A1 | 10/2009 | Frohlich et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran De Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0220967 A1 | 9/2010 | Cooke et al. |
| 2010/0247051 A1* | 9/2010 | Kowalczyk et al. .......... 385/135 |
| 2010/0278499 A1 | 11/2010 | Mures et al. |

(56) References Cited

U.S. PATENT DOCUMENTS

| | | |
|---|---|---|
| 2010/0296790 A1 | 11/2010 | Cooke et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322582 A1 | 12/2010 | Cooke et al. |
| 2010/0322583 A1 | 12/2010 | Cooke et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0280537 A1 | 11/2011 | Cowen et al. |
| 2012/0051707 A1 | 3/2012 | Barnes et al. |
| 2012/0057838 A1 | 3/2012 | Hill et al. .................. 385/135 |
| 2012/0183263 A1 | 7/2012 | Wu |
| 2013/0077927 A1 | 3/2013 | O'Connor |

FOREIGN PATENT DOCUMENTS

| | | |
|---|---|---|
| CH | 688705 A5 | 1/1998 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1203974 A2 | 5/2002 |
| EP | 1289319 A2 | 3/2003 |
| EP | 1316829 A2 | 6/2003 |
| EP | 1777563 A1 | 4/2007 |
| FR | 2378378 A1 | 8/1978 |
| GB | 2241591 A | 9/1991 |
| GB | 2277812 A | 11/1994 |
| JP | 3172806 A | 7/1991 |
| JP | 5045541 A | 2/1993 |
| JP | 06018749 A | 1/1994 |
| JP | 7308011 A | 11/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9744605 A1 | 11/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2009120280 A2 | 10/2009 |

OTHER PUBLICATIONS

Non-final Office Action U.S. Appl. No. 12/915,682 mailed Oct. 24, 2012, 8 pages.

Non-final Office Action for U.S. Appl. No. 12/818,986 mailed Feb. 3, 2012, 12 pages.

(56) References Cited

OTHER PUBLICATIONS

Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.1 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 12/707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 121323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.

(56) References Cited

OTHER PUBLICATIONS

Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.I-com.com/content/Article.aspx?Type=P&ID=438.
"19" Rack Panel with 16 MPO Fiber Optic Couplers—1U high, product page, accessed Oct. 23, 2012, 2 pages, http://www.I-com.com/item.aspx?id=9767#.UlbgG8XXay5.
"Drawing for L-com 1U Panel with 16 MTP couplers," May 15, 2007, 1 page, http://www.1-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
International Search Report for PCT/US20101038986 mailed Aug. 18, 2010, 1 page.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1-and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.

(56) References Cited

OTHER PUBLICATIONS

International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 121/323,423, 13 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Advisory Action for U.S. Appl. No. 12/953,134 mailed Nov. 4, 2013, 3 pages.
Notice of Allowance for U.S. Appl. No. 13/292,130 mailed Oct. 18, 2013, 9 pages.
Non-final Office Action for U.S. Appl. No. 13/901,074 mailed Oct. 9, 2013, 6 pages.
Final Office Action for U.S. Appl. No. 12/952,960 mailed Oct. 29, 2013, 8 pages.
Non-final Office Action for U.S. Appl. No. 12/956,446 mailed Sep. 6, 2013, 10 pages.

* cited by examiner

MULTI-LAYER MODULE

CROSS REFERENCE

This application claims priority to U.S. Provisional Ser. No. 61/330,162 filed on Apr. 30, 2010 and entitled "FIBER OPTIC MODULE". This application is also related to U.S. application Ser. No. 12/956,446, entitled "Module with Adapter Side Entry Opening" and U.S. application Ser. No. 12/956,509, entitled "Multi-Configurable Splice Holder," both of which were filed on the same day as this application and both of which are incorporated by reference in their entireties.

BACKGROUND

1. Field

The present disclosure generally relates to fiber optic modules and, more specifically, to embodiments of a fiber optic module that utilize a plurality of layers for fiber management.

2. Technical Background

In fiber optic and other cable installations, there is often a desire to splice a field fiber in order to utilize a fiber adapter. As such, a multi-fiber cable may be routed to a splice module. The splice module may be configured to facilitate splicing of a field fiber with an optical fiber (such as a pigtail fiber), as well as store excess slack from the multi-fiber cable. However, oftentimes, the fiber optic cable may become disorganized and/or tangled within the splice module, such that maintenance on the multi-fiber cable and/or splicing connection can become difficult. Additionally, as maintenance is required, oftentimes a splice module is unable to store adequate slack to perform the desired maintenance.

Further, during installation and/or maintenance, a field technician may be uncertain whether the splice module will be utilized for single fiber splicing or mass fusion splicing until the field technician analyzes the cable configuration. As such, the field technician may be forced to carry multiple splice modules and/or splice holders to a site. Similarly, in situations where a splice module connection is to be changed from an individual fiber splice to mass fusion splice, the field technician may be forced to disconnect a current splice module and substitute the current splice module with a splice module that conforms to the new connection.

Similarly, in some scenarios, the splice module may be mounted in a module receiving device, such as a telecommunications rack, or other similar structure, with adapters facing through a front opening of the telecommunications rack. As current splice modules include a back entry opening for passing the multi-fiber cable to the splice module, access to the splice module may be difficult. Additionally, such configurations may be difficult to install and/or maintain due to the field technician being unable to perform the desire procedures within the confined area of the telecommunications rack.

SUMMARY

Embodiments disclosed herein include a multi-layer module that includes a multi-fiber cable storage layer having a cable entry opening and a cable winding structure. Also included is a splice storage layer that is discrete from the multi-fiber cable storage layer, the splice storage layer having a splice layer receiving opening in communication with the multi-fiber cable storage layer and a slack storage area. In some embodiments, the multi-layer module includes a pigtail storage layer that is discrete from both the multi-fiber cable storage layer and the splice storage layer, the pigtail storage layer having a pigtail connector area and a pigtail storage area, the pigtail storage area comprising a pigtail storage layer receiving opening in communication with the splice storage layer.

Additional features and advantages will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
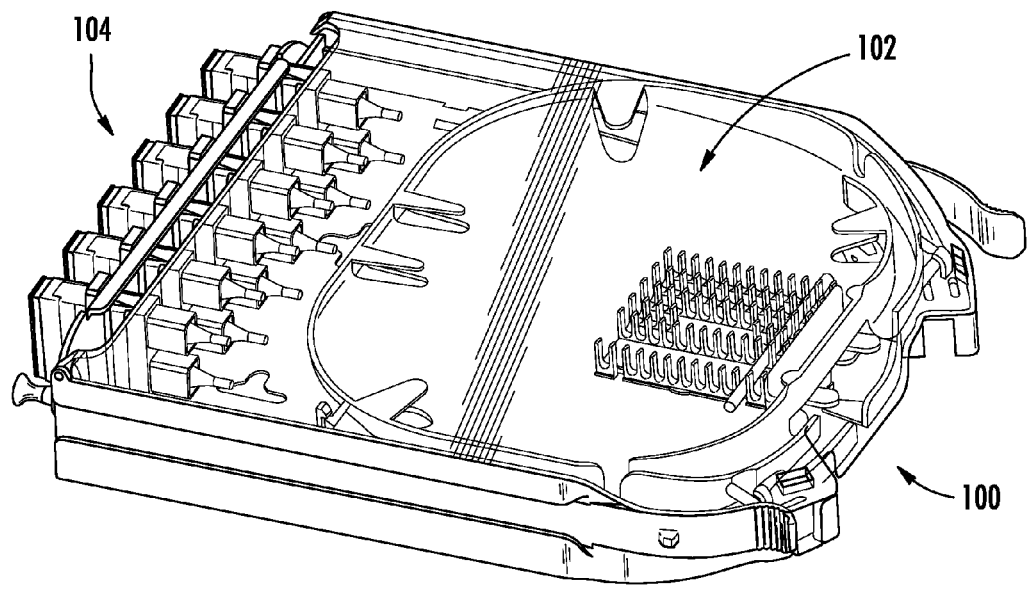
FIG. 1 depicts a multi-layer splice module with a substantially translucent cover in the closed position which allows viewing of internal structure of the module.

Referring initially to the drawings, FIG. 1 depicts a multi-layer module 100, according to embodiments disclosed herein. As illustrated, the multi-layer module 100 includes a housing that is coupled to a hinged cover 102 that is disposed on one of a pair of major faces and an adapter plate 104 that removably couples to the multi-layer module 100 at an adapter opening, where the adapter opening and the adapter plate collectively define an adapter plate area of the module housing. While the cover on the major face provides a closed framework, depending on the particular embodiment, the multi-layer splice module may have an open or closed framework. As illustrated, the hinged cover 102 may be substantially transparent such that a user may view inside the multi-layer module 100 without having to open the hinged cover 102. Additionally, the hinged cover 102 may provide an open position and/or a closed position. In the open position, the hinged cover 102 provides access to the splice storage layer 204. However, in the closed position, the hinged cover 102 covers at least a portion of the splice storage layer 204. Additionally, it should also be understood that for the purposes of describing and defining the present invention, it is noted that the term "substantially transparent" is utilized to refer to a component that allows passage of light there through to provide at least a partial view of components within. Additionally, it should be understood that while the present application discusses the multi-layer module 100, other types of cassettes for storing optical fiber may also be included within the scope of this application.

When fully assembled and installed in the field, adapter plate 104 includes a plurality of adapters that are connected to respective connectors inside the multi-layer module 100, this is merely an example. More specifically, in some embodiments, the connectors may be removed and/or not present. Likewise, the adapter plate 104 can be configured to accommodate any suitable style of adapters such as single fiber adapters (e.g., LC and SC), duplex adapters (e.g., LC), multi-fiber adapters (e.g., MT) and/or adapters that are ganged together.

Figure 2:
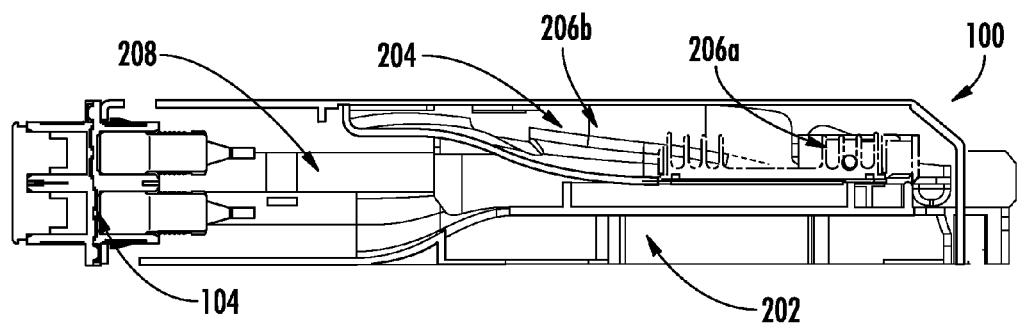
FIG. 2 depicts the multi-layer splice module, further illustrating three layers for routing and storage of an optical cable, such as a multi-fiber cable.

FIG. 2 depicts the multi-layer module 100, further illustrating three layers for storage of an optical cable, such as a multi-fiber cable, according to embodiments disclosed herein. As illustrated, a multi-fiber cable storage layer 202 may be included as part of the multi-layer module 100. Also included is a splice storage layer 204, which includes a splice holder 206a and a slack storage area 206b. The splice storage layer 204 is discrete from the multi-fiber cable storage layer 202. A pigtail storage layer 208 is also included and is arranged so that it is in communication with the backside of an adapter plate 104. The pigtail storage layer is also discrete from both the multi-fiber cable storage layer 202 and the splice storage layer 204. The adapter plate 104 may include one or more adapters that are coupled to one or more respective pigtail fibers, described in more detail, below. As also illustrated, the pigtail storage layer 208 has a thickness at the adapter plate that is equal to the thickness of the multi-layer module 100 as a whole. Additionally, the pigtail storage layer 208 is tapered inward to a reduced layer thickness to accommodate the splice storage layer 204 and the multi-fiber cable storage layer 202 within the thickness of the multi-layer module 100. As illustrated, the layers are arranged in an offset manner, such that a portion of the pigtail storage layer 208 resides within the intervening space between (i.e., disposed between) the multi-fiber cable storage layer 202 and the splice storage layer 204.

For the purposes of describing and defining the embodiments disclosed, it is noted that a module layer is "discrete from" another module layer when one or more intervening structural members of the module serve to at least partially contain fiber or cable in one of the layers. While the embodiment of FIG. 2 illustrates the multi-layer module 100 with a constant thickness, this is merely an example and other arrangements are possible according to the concepts disclosed. More specifically, in some embodiments, the multi-layered splice module is configured with a varying thickness. As shown in FIG. 2, the pigtail storage layer 208 tapers to a smaller height to accommodate the multi-fiber cable storage layer 202 and the splice storage layer 204 at the bottom and top. Additionally, in some embodiments, the multi-fiber cable storage layer 202 and the splice storage layer 204 do not extend to the adapter plate 104.

Figure 3:
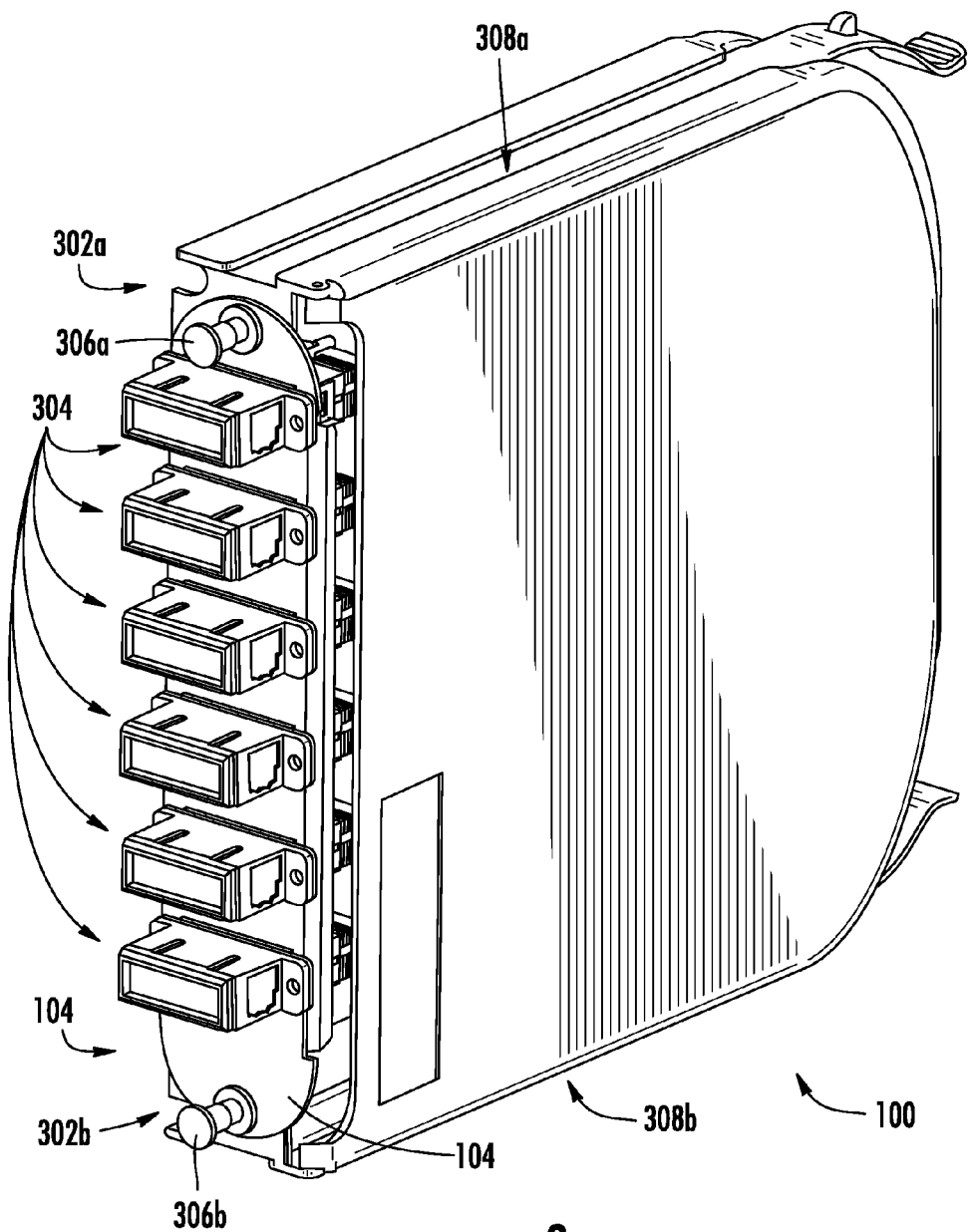
FIG. 3 depicts a front view of the multi-layer splice module showing multi-fiber adapters.

FIG. 3 depicts a front view of the multi-layer module 100, according to embodiments disclose herein. As illustrated, the multi-layer module 100 includes front cable entry openings 302a, 302b for receiving a multi-fiber cable. The front cable entry openings 302a, 302b may have any suitable shape for cable/fiber ingress and/or egress such as generally round, rectangular, oval and/or other suitable shapes. Additionally, in some embodiments, the front cable entry openings 302a, 302b may be disposed on an edge of the adapter side, disposed on the adapter side of the module housing at a housing edge defined at an intersection of one of the pair of major faces of the module housing and the adapter side of the module housing, such that the front cable entry opening includes a partially open periphery for receiving a transversely loaded multi-fiber cable. For the purposes of describing and defining the present invention, it is noted that a "transversely loaded" cable is introduced into a cable opening laterally from a periphery of the opening towards the center of the opening, without the need for threading a free end of the cable through the opening, as opposed to being threaded head first along a center axis of the opening. Additionally, the front cable entry openings 302a, 302b may have a range of dimension to facilitate a frictional connection with the multi-fiber cable.

Also included is the adapter plate 104, which is configured to receive one or more adapters 304. The adapter plate 104 also includes release components 306a, 306b for removing the adapter plate 104 from the multi-layer module 100. The release components 306a, 306b may be configured to interact with corresponding adapter plate openings (see FIG. 4) that reside on the multi-layer module 100. Also included on the multi-layer module 100 are a plurality of mounting tracks that are disposed on respective minor faces of the multi-layer module 100, such as mounting tracks 308a, 308b for mounting the multi-layer module 100, as described in more detail, below.

It should be understood that while the front cable entry openings 302a, 302b are illustrated in the context of a multi-layer cable splice module, this is merely an example. More specifically, the concept of using front cable entry openings 302a, 302b can be implemented on any suitable module for increasing the flexibility of use for the craft. In other words, having front cable entry openings allows the craft to use the module many different mounting arrangements since the cables/fibers can enter the module from different locations, thereby allowing use of the module beyond the typical housing arrangement by the mounting of the module to a wall using fasteners. Additionally, modules having front cable entry openings can also have conventional openings at the rear for cable entry.

Figure 4:
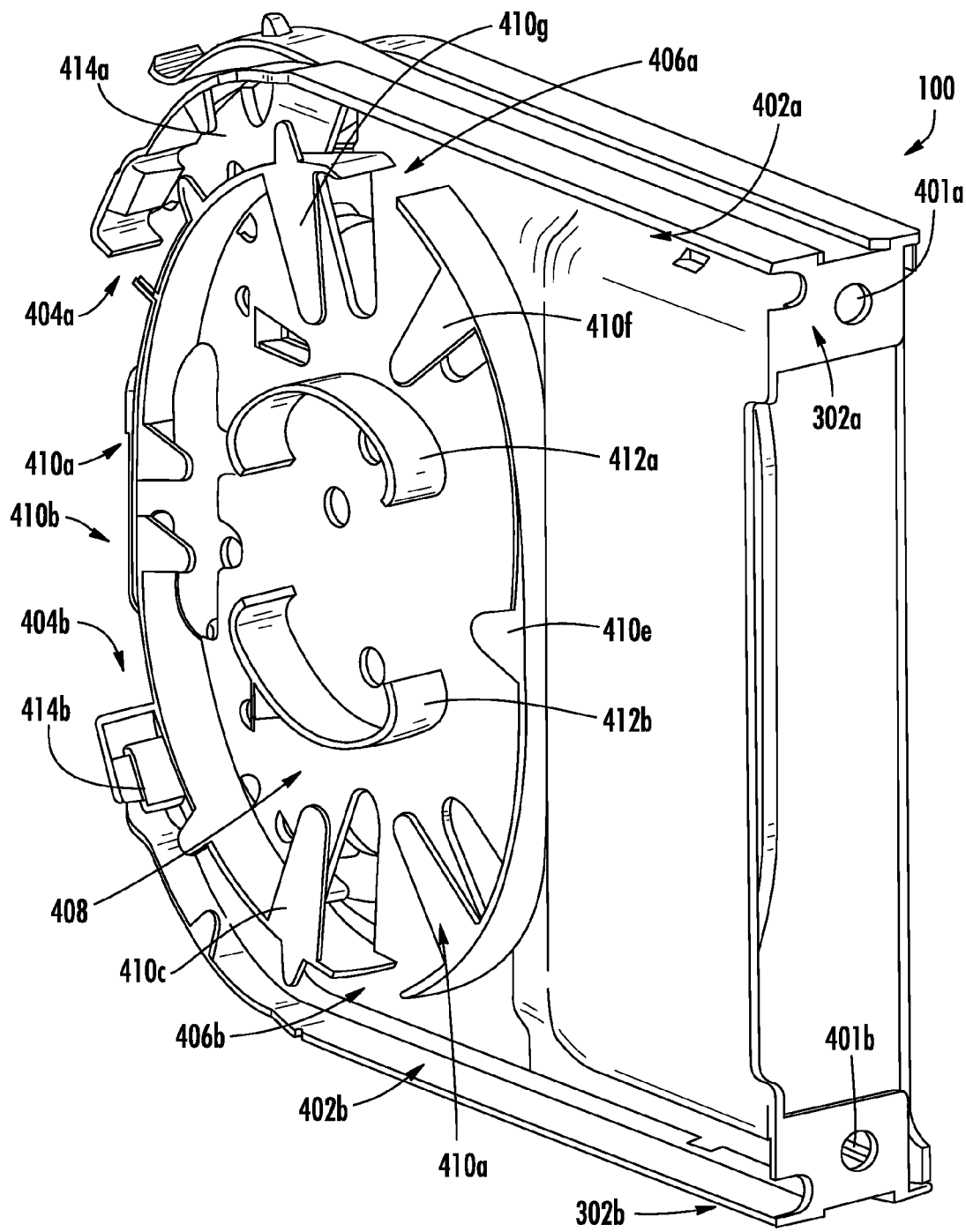
FIG. 4 depicts a perspective view of a portion of the multi-layer splice module.

FIG. 4 depicts a perspective view of another of the pair of the major faces of the multi-layer module 100, according to embodiments disclosed herein. As illustrated, the multi-layer module 100 has an open framework on the major face and includes the adapter plate openings 401a, 401b for receiving and removably securing the adapter plate 104. Also included are front cable trajectories 401a, 402b for receiving a multi-fiber cable from the front cable entry openings 302a, 302b, respectively. From the trajectories, the multi-fiber cable may be routed to receiving openings 406a, 406b. The receiving openings 406a, 406b are in communication with the cable winding structure 408.

Similarly, a multi-fiber cable may be received by the multi-fiber splice module 100 at one or more of the back cable entry openings 404a, 404b. From the back cable entry openings 404a, 404b, the multi-fiber cable may be routed, via a back cable trajectory 414a, 414b to the receiving openings 406a, 406b. Regardless of whether the multi-fiber cable is received at the front cable entry openings 302a, 302b or received at the back cable entry openings 404a, 404b, the cable winding structure 408 may accommodate the multi-fiber cable, which may be wound around a perimeter of the cable winding structure 408. More specifically, the multi-fiber cable may be removably secured by one or more cable securing mechanisms 410a-410g. Additionally, the cable winding structure 408 may include a plurality of cable re-routing walls 412a, 412b. The plurality of cable re-routing walls 412a, 412b may be shaped in a rounded manner to provide a winding radius of the multi-fiber cable. Additionally, between the plurality of cable re-routing walls 412a, 412b, is a re-routing passage to facilitate a change in direction of winding of the multi-fiber cable.

For the purposes of describing and defining the disclosed embodiments, it is noted that the term "perimeter" is utilized to refer to components that are along an outer region of an area. Similarly, for the purposes of describing and defining the disclosed embodiments, it is noted that reference herein to a structural component extending "between" to related components is not utilized herein to require that the component extends from one related component to the other. Rather, the component may merely extend along a portion of a pathway from one component to the other. For example, the adapter side and the back side of the module housing are described herein as extending between the pair of major faces of the module housing, but it is noted that these sides need not span the entire distance between the two faces. While the example of FIG. 4, the multi-fiber cable storage layer 202 has an open framework and thus does not include a cover, this is merely an example. More specifically, in some embodiments, a cover may be included, similar to the hinged cover 102, from FIG. 1.

Figure 5:
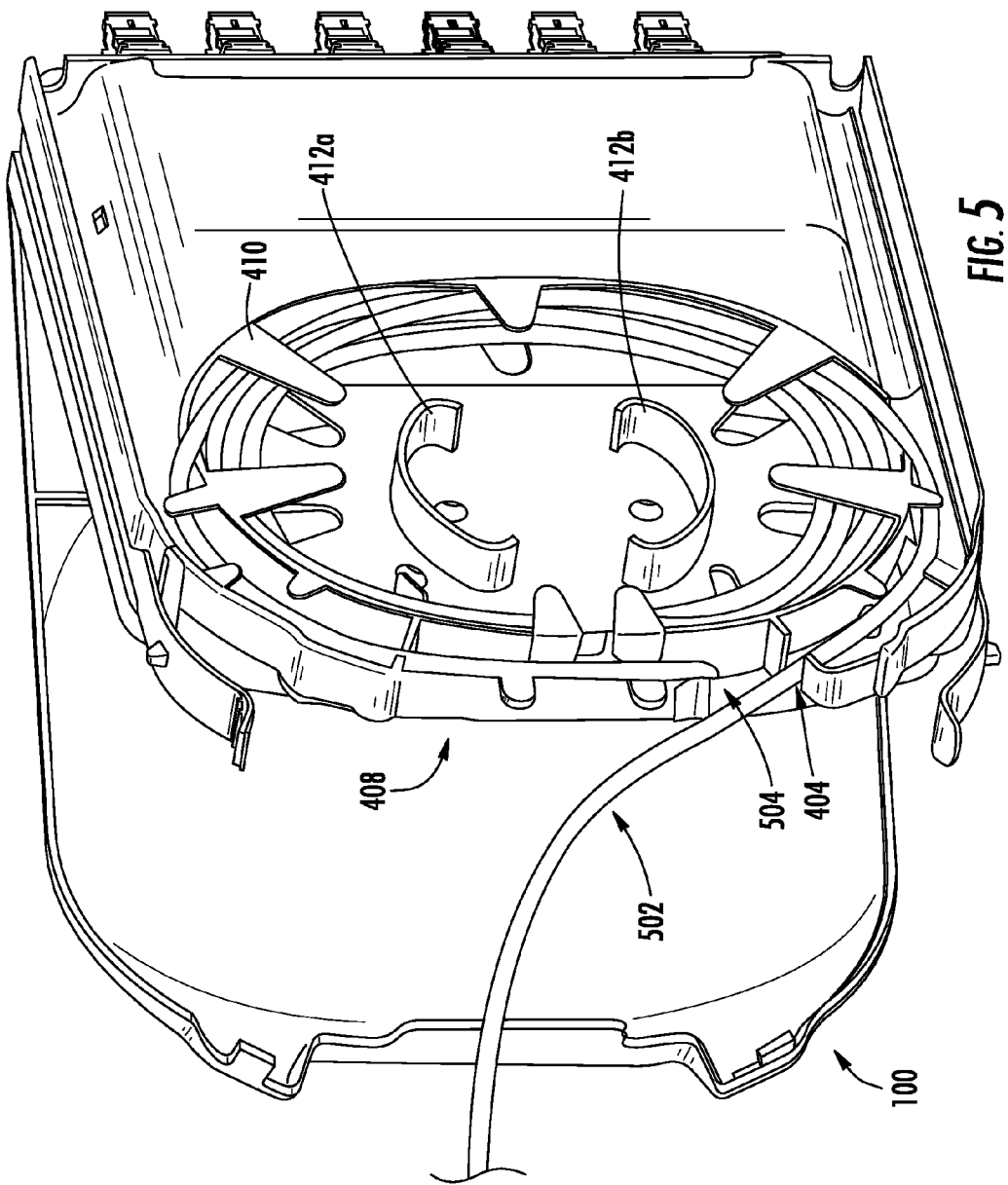
FIG. 5 depicts another perspective view of the multi-fiber cable storage layer, with a multi-fiber cable disposed therein.

FIG. 5 depicts another perspective view of the multi-fiber cable storage layer 202, with a multi-fiber cable 502. As illustrated, the multi-fiber cable 502 is routed to the back cable entry opening 404, through the back cable trajectories 414. From the back cable trajectory 414, the multi-fiber cable 502 may be routed to the cable winding structure 408 and secured by the cable securing mechanisms 410. The multi-fiber cable 502 may be routed and/or re-routed by the cable re-routing walls 412a, 412b and then routed to the splice storage layer 204 (FIG. 2), via a disposing opening 504.

While the front cable trajectories and the back cable trajectories may be any configuration for routing the multi-fiber cable above a minimum bending radius defined by the multi-directional radius-limiting cable winding structure, in some embodiments they may be configured as front multi-fiber cable channels and back multi-fiber cable channels.

Figure 6:
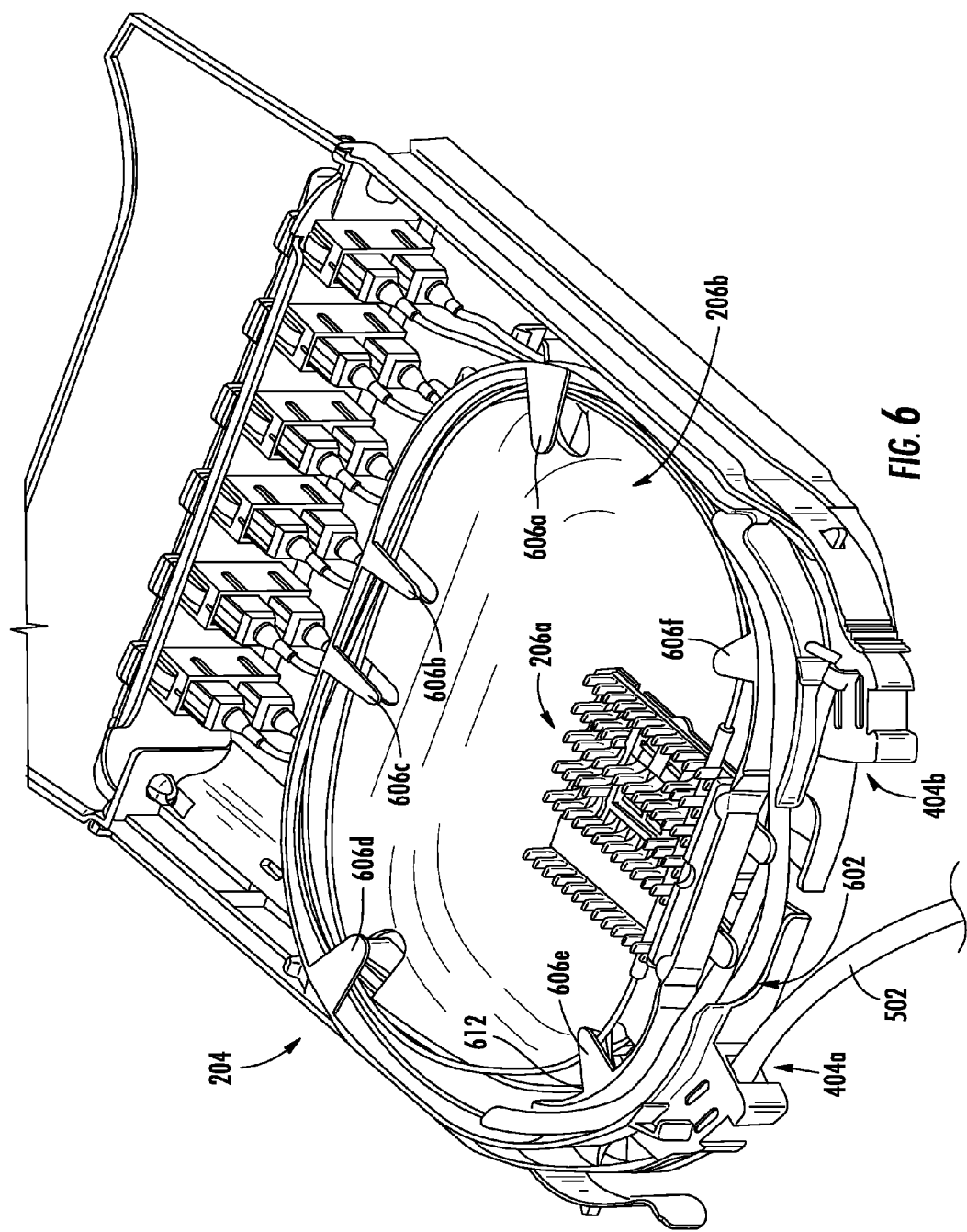
FIG. 6 depicts a perspective view of the splice storage layer with the cover in an open position and showing duplex adapters secured to the adapter plate along a routed cable with a splice.

FIG. 6 depicts a perspective view of the splice storage layer 204, according to embodiments disclosed herein. As illustrated, from the disposing opening 504 (FIG. 5), the multi-fiber cable 502 can be received at a splice layer receiving opening 602. From the splice layer receiving opening 602, the multi-fiber cable 502 can be routed into the slack storage area 206b. More specifically, in some embodiments, the multi-fiber cable 502 may be separated into individual fibers and the individual fibers may be routed along a perimeter of the splice storage layer 204. The individual fibers may be removably secured by one or more splice layer securing mechanisms 606a-606f. The individual fibers may additionally be spliced with an optical fiber cable, such as a pigtail fiber at the splice holder 206a. The optical fiber cable may include one or more optical fibers and may then be routed to a splice layer disposing opening.

In some embodiments, the multi-fiber cable 502 may be stripped into individual fibers for routing, but this is not necessary. By way of example, the multi-fiber cable may be routed to the splice holder 206a without being separated into individual fibers or may be routed in one or more groups of fibers.

Figure 7:
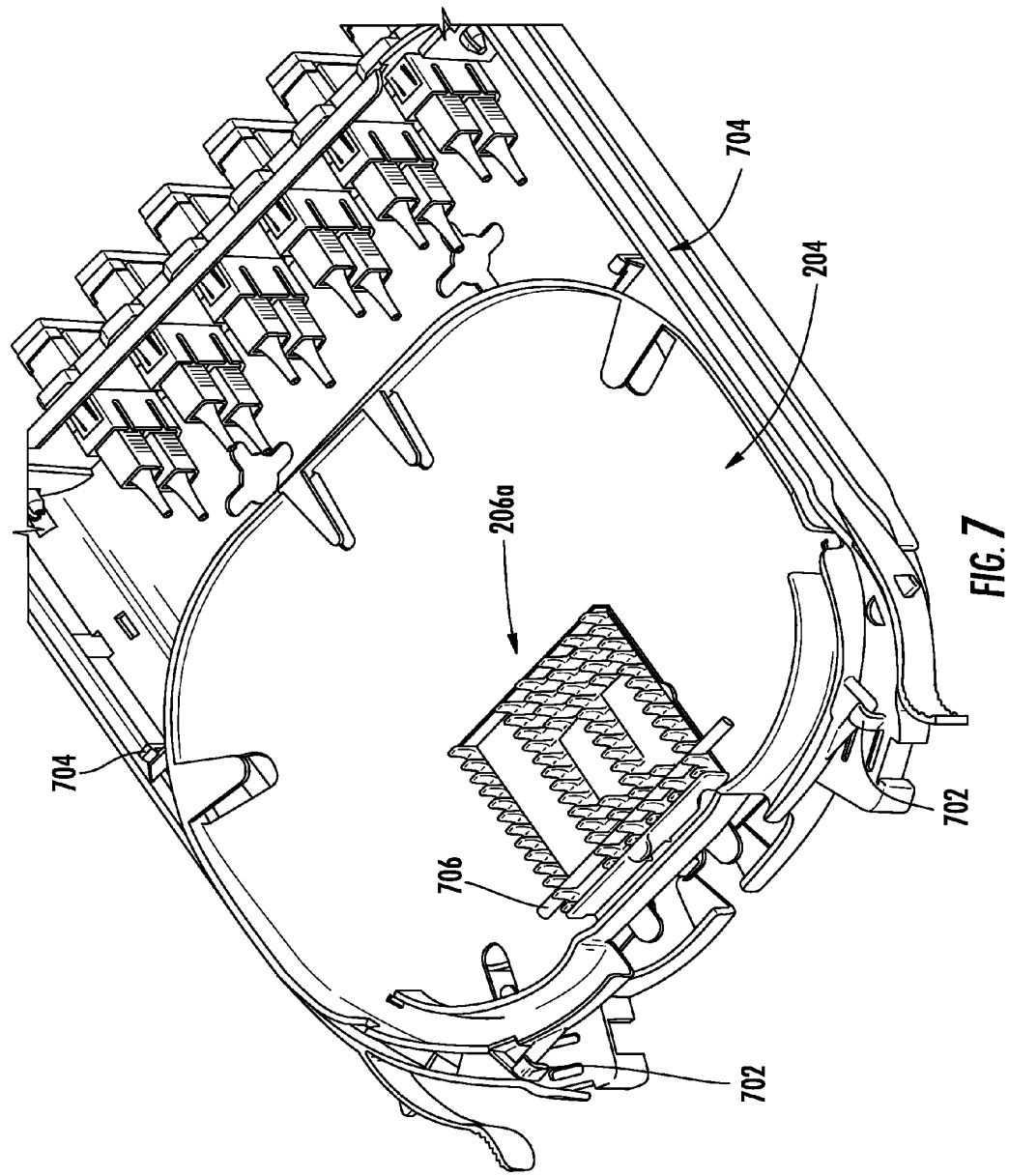
FIG. 7 depicts another perspective view of the splice storage layer with the cable removed.

FIG. 7 depicts another perspective view of the splice storage layer 204, according to embodiments disclosed herein. As illustrated, the splice storage layer 204 can removably secure the splice holder 206a. Depending on the particular embodiment, the splice holder 206a may be configured for removably securing a fiber splice component 706, a mass fusion splice component, and/or other similar component, as described in more detail below. Additionally illustrated in FIG. 7 are splice layer hinges 702 and splice layer latches 704. More specifically, the splice storage layer 204 may be pivotally attached to the multi-layer module 100 and act as a hinged separator to provide access to the pigtail storage layer 208, as described in more detail, below.

Figure 8:
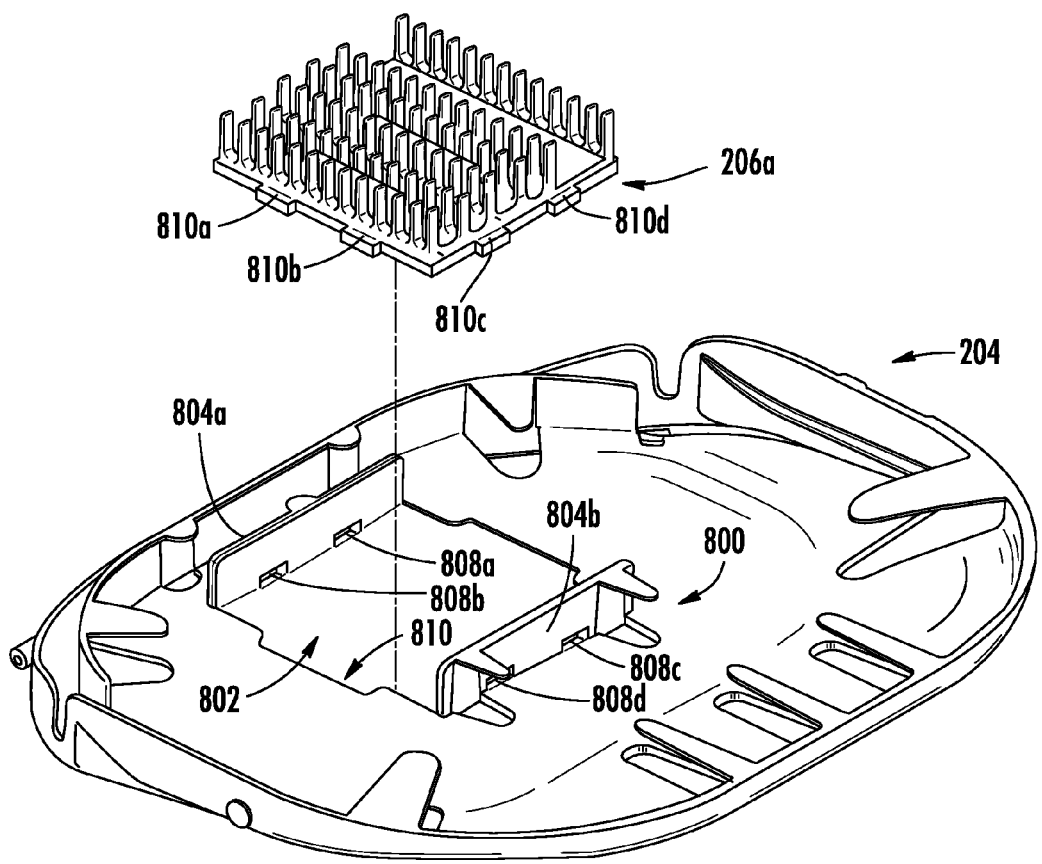
FIG. 8 depicts another partially exploded perspective view of the splice storage layer, further illustrating utilization of the splice holder.
Figure 9:
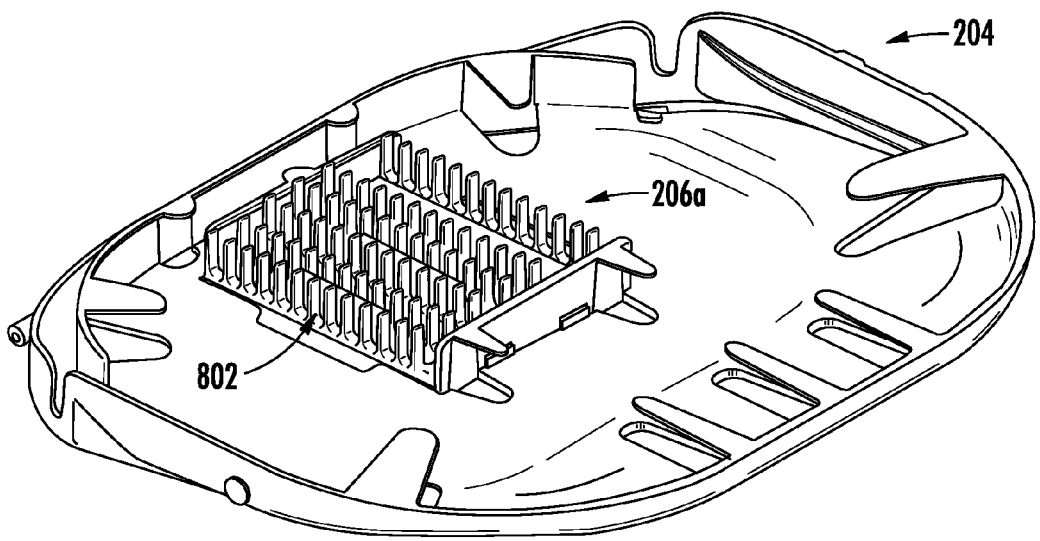
FIG. 9 depicts the splice holder from FIG. 8 residing within the splice holder seat.

FIG. 7 depicts the splice holder 206a being housed in a multi-layer module 100; however, splice holders according to the concepts disclosed herein may be used in other modules or hardware as desired. FIGS. 8 and 9 depict splice holder 206a being secured to the splice module for receiving and splicing multi-fiber cable in an organized fashion.

FIG. 8 depicts another perspective view of the splice storage layer 204, further illustrating utilization of the splice holder 206a. As illustrated, the splice storage layer 204 includes a splice holder seat 800. The splice holder seat 800 may be configured with a splice holder footprint area 802, which may be configured as a depressed area for receiving the splice holder 206a. The splice holder footprint area 802 may be of any shape, but in some embodiments is relatively square in shape with approximately the same dimensions as the splice holder 206a. Accordingly, the splice holder may be inserted into the splice holder footprint area 802 along a first orientation and/or rotated 90 degrees. As discussed in more detail below, this allows the splice holder to secure at least one fiber splice component (FIG. 7) in the first orientation and mass fusion splice components, when rotated 90 degrees to a second orientation.

Splice holder 206a may be have any suitable shape that allows different splice storage arrangements in different directions. By way of example, the splice holder may have shapes such as circular, polygons such pentagonal, hexagonal, heptagonal, octagonal in shape and/or otherwise configured for rotation about a predetermined angle to implement a different type of splice holding configuration. Moreover, the concepts of the splice holder may be used any suitable material such as pliable or rigid materials. Likewise, the splice holder can have any suitable attachment features such as adhesive tapes, sliding structures, clip structures, etc. However, the modules disclosed herein can use any suitable splice holder and associated splice holder seat 800 such as a splice holder that is not configured for rotation and may take any shape that removably secures the splice holder.

Additionally included as part of the splice holder seat is a raised portion, such as raised portions 804a, 804b. The raised portions 804a, 804b may extend from the splice storage layer 204 to at least partially surround the splice holder 206a, when placed in the splice holder seat 800. The raised portions 804a, 804b may additionally include extension receiving mechanisms 808a-808d for engaging with a plurality of extension tabs 810a-810d.

FIG. 9 depicts the splice holder 206a from FIG. 8 residing within the splice holder seat 800. As illustrated, the splice holder 206a may be removably secured within the splice holder seat 800 and may be configured for being secured in a plurality of orientations, such that the splice holder 206a may secure a fiber splice component 706 and/or a mass fusion splice component.

Figure 10A:
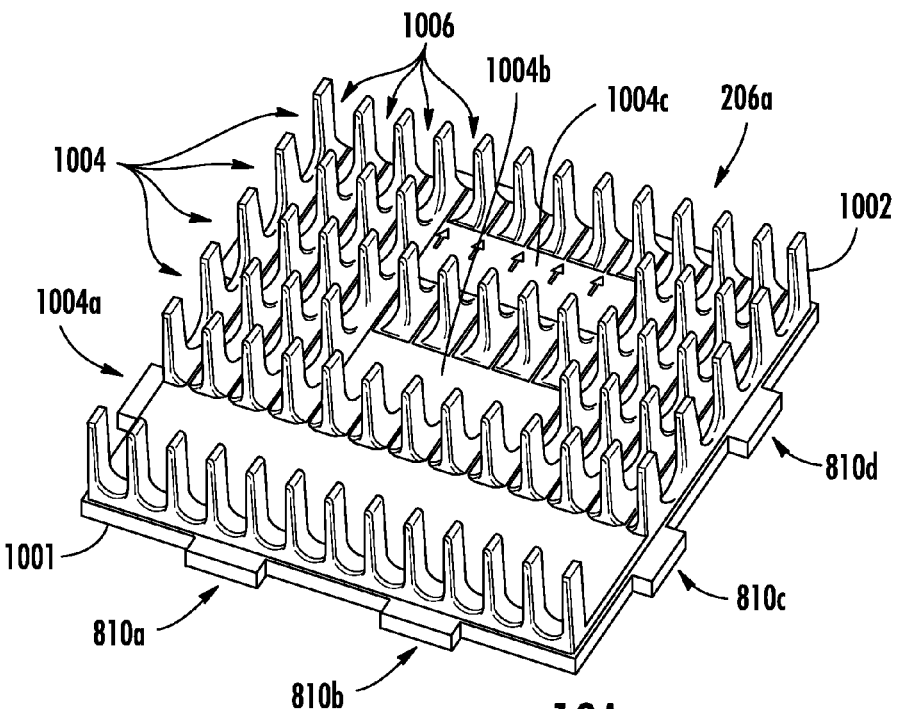
FIG. 10A depicts a perspective view of the splice holder of FIGS. 8 and 9 in more detail.

FIG. 10A depicts a perspective view of the splice holder 206a in more detail. As illustrated, the splice holder 206a may include a base portion 1001, which is coupled to an array splice holding partitions 1002 that extend from the base portion 1001 and are positioned at an intersection of mass fusion columns 1004 and fiber rows 1006. The splice holding partitions 1002 may be shaped such to create the mass fusion columns 1004 and the fiber rows 1006. The fiber rows 1006 are configured to receive and removably secure at least one fiber splice component at a fiber splice component seat that has a first radius of curvature (when round in shape), while the mass fusion columns 1004 are configured to receive and removably secure the larger mass fusion splice components at a mass fusion splice component seat that has a second radius of curvature (when round in shape). As also illustrated, the fiber rows 1006 include a row-forming surface portion that opposes a complementary row-forming surface portion of an adjacent splice holding partition 1002. Similarly, the mass fusion columns 1004 include a column-forming surface portion that opposes a complementary column-forming surface portion of an adjacent splice holding partition 1002.

Also included in the splice holder 206a are a transition box area 1004a and transition box areas 1004b, 1004c. More specifically, the transition box area 1004a may be defined by a subset of the splice holding partitions 1002, where selected pairs of the subset of splice holding partitions include opposing surface portions that define a transition box area width that is larger than the mass fusion column width. The transition box area 1004a may be configured to receive and removably store a ribbon cable that is wider than a mass fusion cable. Thus, the transition box area 1004a may extend the length of the splice holder 206a. Similarly, a subset of the splice holding partitions 1002 may be arranged to define the mass fusion areas 100b, 1004c for receiving and removably securing a transition box. However, while the transition box area 1004a extends the length of the splice holder 206a, the transition box areas 1004b, 1004c may extend a portion of the length of the splice holder 206a. Regardless, in some embodiments, selected pairs of the subset of splice holding partitions 1002 include opposing surface portions that define a transition box area width that is larger than the mass fusion column width.

As also illustrated, a plurality of individual splice holding partitions 1002 can cooperate with the base portion 1001 and adjacent splice holding partitions 1002 to a define splice component seats (e.g., mass fusion splice component seats and fiber splice component seats) that extend from the plurality of individual splice holding partitions across a fiber row and across a mass fusion column. More specifically, as illustrated in FIG. 10A, the component seats may include a basin between adjacent splice holding partitions 1002. In embodiments where the basin is rounded, the component seats define a radius of curvature that complements an outside diameter of the fiber splice component or the mass fusion splice component. While in FIG. 10A, the splice component seats are rounded in shape, other shapes may also be utilized (such as rectangular, triangular, etc.) for removably securing a fiber splice component 706. Similarly, in some embodiments, the adjacent splice holding partitions 1002 may be shaped to create a basin for receiving and removably securing a mass fusion splice component.

Figure 10B:
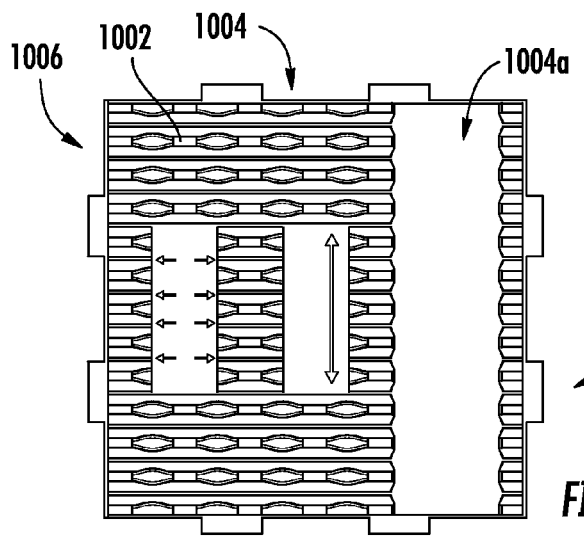
FIG. 10B depicts an overhead view of the splice holder of FIGS. 8 and 9.

FIG. 10B depicts an overhead view of the splice holder 206a, according to embodiments disclosed herein. As illustrated, the splice holding partitions 1002, and thus the mass fusion columns 1004 and the fiber rows 1006, may be shaped to secure fiber splice component 706 and mass fusion splice components, respectively. One mechanism for doing this is clearly illustrated in FIG. 11, which depicts that the fiber rows having a variable fiber row width between each of the splice holding partitions 1002. More specifically, the fiber rows are bowed between the splice holding partitions 1002 to provide a friction connection with a fiber splice component 706.

Figure 10C:
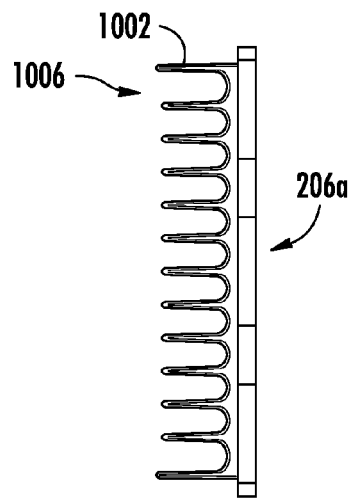
FIG. 10C depicts a side view of the splice holder of FIGS. 8 and 9.

FIG. 10C depicts a side view of the splice holder 206a, further illustrating the fiber rows 1006, according to embodiments disclosed herein. As illustrated, the splice holding partitions 1002 may define the fiber rows 1006 with a rounded basin. Additionally, while the embodiment of FIG. 10C illustrates splice holding partitions 1002 that are substantially parallel, in some embodiments, the splice holding partitions are tapered to further provide a variable fiber row width that is narrower at the base basin than at the entry portion. This further facilitates a friction connection with the fiber splice component 706.

Figure 10D:
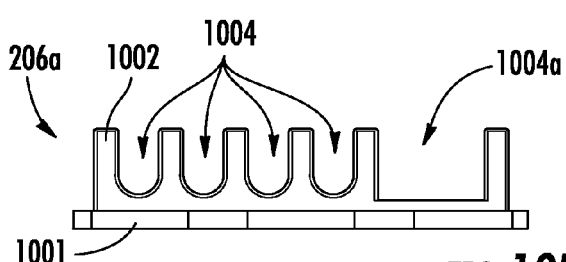
FIG. 10D depicts a side view of the splice holder, further illustrating the mass fusion columns of FIGS. 8 and 9.

FIG. 10D depicts a side view of the splice holder 206a, further illustrating the mass fusion columns 1004, according to embodiments disclosed herein. As illustrated, in some embodiments, the mass fusion columns 1004 may also have a rounded basin. Additionally, in some embodiments, the mass fusion width (which is defined by adjacent splice holding partitions 1002) may be constant, while in some embodiments, splice holding partitions 1002 may be tapered to provide a variable mass fusion column width that is greater at an entry portion at the basin, to further facilitate a friction connection with a mass fusion splice component.

It should be understood that while the exemplary embodiments of FIGS. 10C and 10D illustrate the splice holding partitions as being formed together as a single piece that is coupled to the base portion 1001, this is merely an example. More specifically, in some embodiments, the splice holding partitions 1002 may be individually connected to a base portion 1001.

Figure 10E:
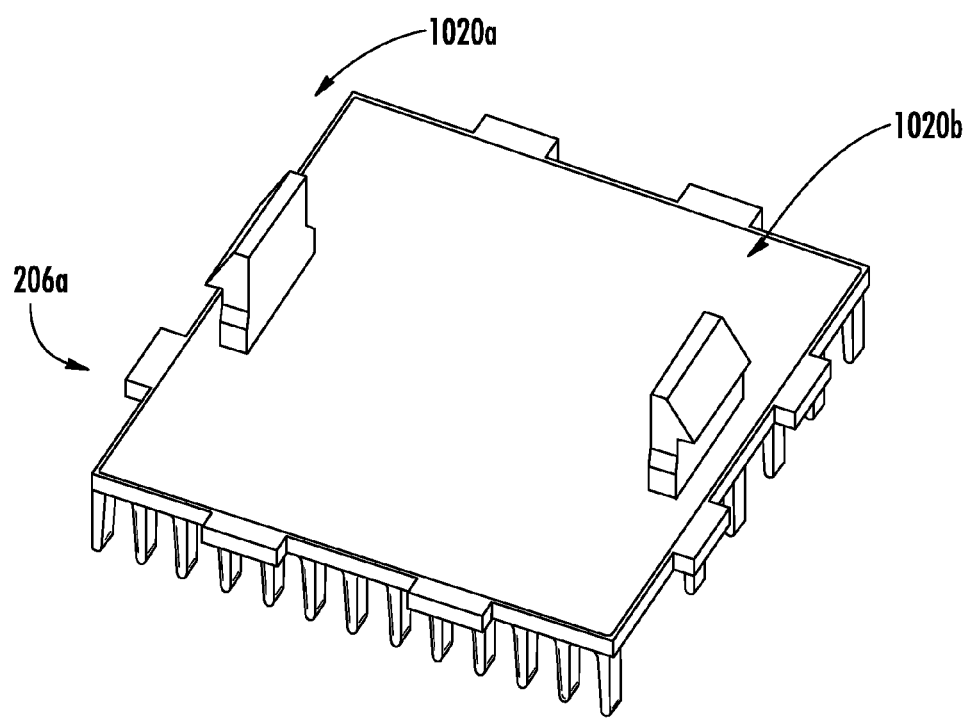
FIG. 10E depicts an underside view of another splice holder further illustrating anchor tabs disposed on the bottom.

FIG. 10E depicts an underside view of a variation of splice holder 206a, further illustrating a plurality of anchor tabs 1020a, 1020b on the bottom. As illustrated, the splice holder 206a may include one or more anchor tabs 1020a, 1020b for removably securing the splice holder 206a with the splice storage layer 204. While the anchor tabs 1020a, 1020b may be configured as illustrated in FIG. 10E, other configurations and/or structures are also contemplated for removably securing the splice holder 206a such as sliding structures, pins, holes, fasteners, etc. using the multi-direction concepts disclosed.

In preferred embodiments, the splice holder 206a is constructed of a pliable material, such as a pliable rubber material. For the purposes of describing and defining the present invention, it is noted that a "pliable rubber material," as used herein, refers to any material that includes rubber and may be bent without breaking and return to its original configuration quickly and easily.

Additionally, while not explicitly illustrated in FIGS. 10A-10E, the splice holder 206a may include a mechanism for further securing a splice component. As an example, in some embodiments, a notch may be formed on at least a portion of the array of splice holding partitions 1002 to prevent a splice component from being inadvertently removed from the splice holder 206a. Similarly, some embodiments may include a cover on at least a portion of the splice holder. In still some embodiments, a clip may be attached to adjacent splice holding partitions 1002 to prevent inadvertent removal of a splice component.

Figure 11:
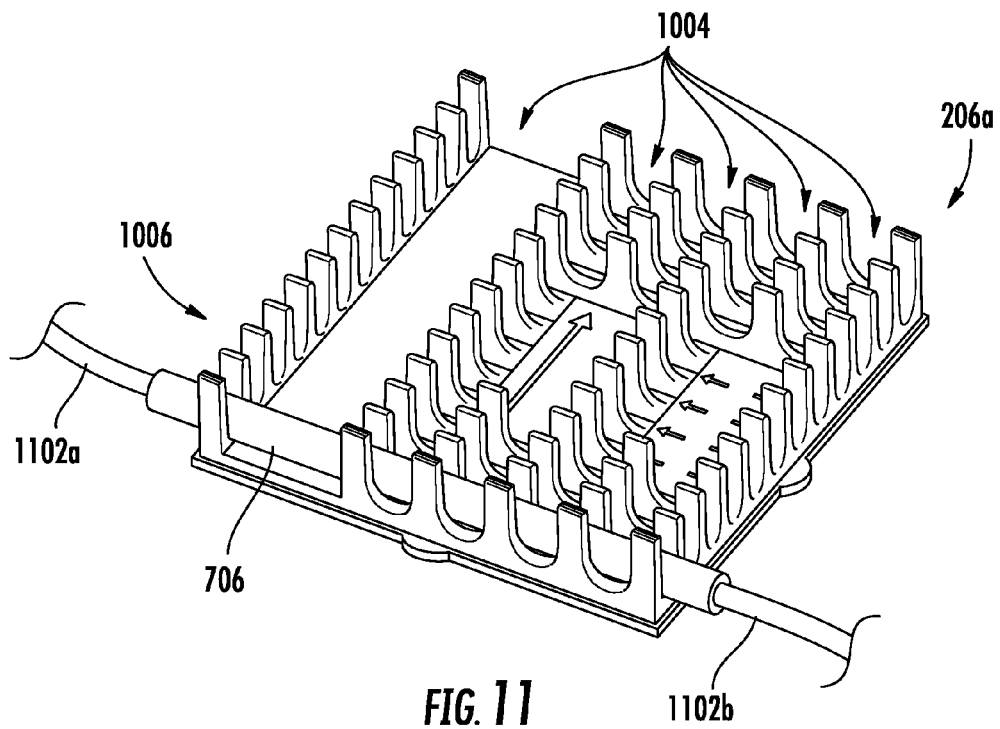
FIG. 11 depicts the splice holder with a fiber splice component disposed therein.

FIG. 11 depicts the splice holder 206a with a fiber splice component 706. As illustrated, a fiber 1102a from a multi-fiber cable 502 may be routed to a fiber splice component 706, which can facilitate a splice with an optical fiber 1002b (such as a pigtail fiber). The fiber splice component 706 may be removably secured to the splice holder 206a via a friction connection and oriented across one of the fiber rows 1004. Additionally, in some embodiments, the splice holder 206a is structured to receive and secure a second fiber splice component that is stacked on top of the fiber splice component 706. As illustrated in FIG. 11, if the fiber splice component 706 is stacked along a length of the splice holder 206a, the second fiber splice component could be stacked along that length on top of the fiber splice component 706.

Figure 12:
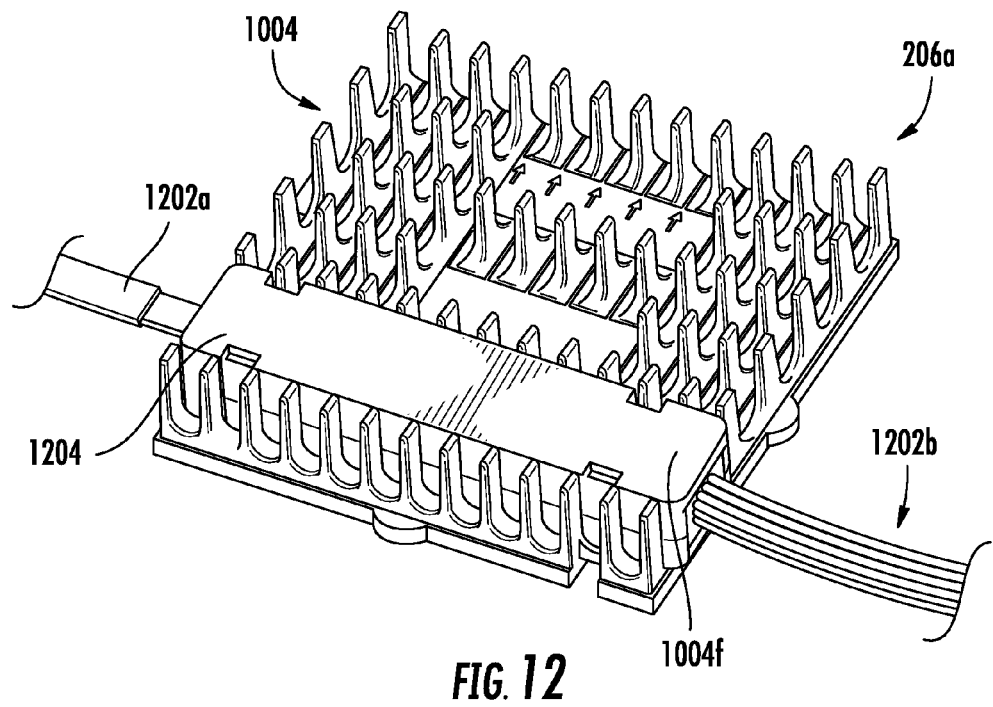
FIG. 12 depicts the splice holder with a ribbon cable box that is inserted into the transition box area of the splice holder.

FIG. 12 depicts the splice holder 206a with a ribbon cable box 1204 that is inserted into the transition box area 1004a. As illustrated, a ribbon cable 1202a is sent to a ribbon cable box 1204 for splicing. Additionally, a plurality of optical fibers 1202b is also coupled to the ribbon box 1024. As discussed above, the transition box area 1004a may be configured to removably secure the ribbon cable box 1204 via a friction connection.

Figure 13:
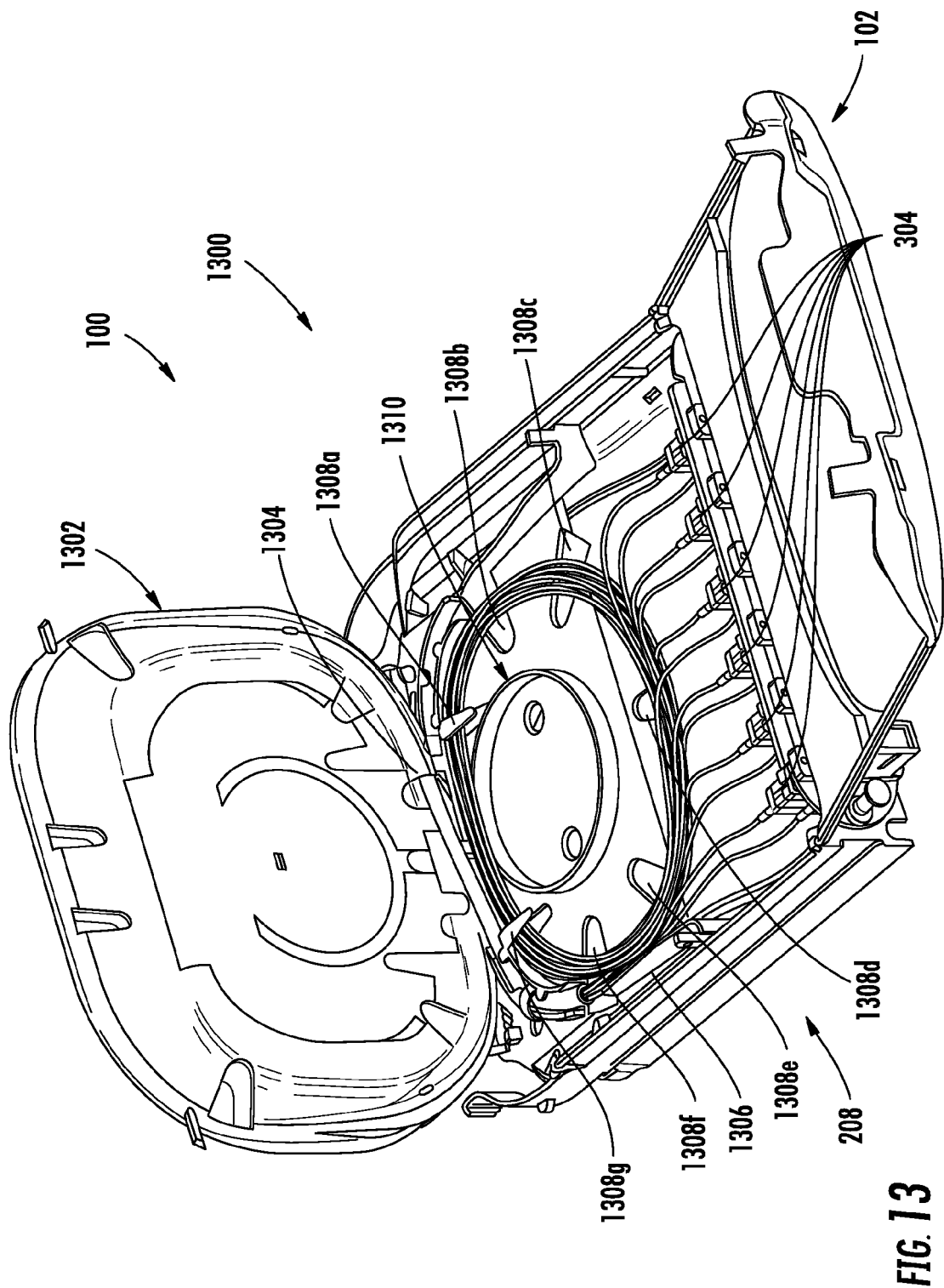
FIG. 13 depicts the multi-layer splice module with the cover and hinged separator in the open positions for further illustrating the pigtail storage layer.

FIG. 13 depicts the multi-layer module 100, further illustrating the pigtail storage layer 208. As illustrated, the optical fiber that was spliced within the splice holder 206a (FIGS. 6, 11, and 12) is routed from the splice storage layer 204 to the pigtail storage layer 208 via a pigtail storage receiving opening 1304. From the pigtail storage receiving opening 1304, the optical fibers 1306 can be routed around a radius limiting hub 1310 and removably secured by a plurality of pigtail storage layer securing mechanisms 1308a-1308e. The optical fibers 1306 may additionally be coupled to the adapters 304.

Additionally included in the example of FIG. 13, is a hinged separator 1302. The hinged separator 1302 may be hinged on an opposite side of the multi-layer module 100 as the hinged cover 102 is hinged and may fit inside the multi-layer module 100 when the hinged cover 102 is closed. Additionally, the hinged separator 1302 may provide an open position to provide access to the pigtail storage layer 208 and a closed position to provide access to the splice storage layer 204. More specifically, the hinged cover 102 may have an opening edge and a pivoting edge, where (as shown in FIG. 13), the opening edge connects with a back side of the multi-layer module 100 and the pivoting edge is positioned toward the adapter side of the multi-layer splice module. Referring back to FIG. 7, in some embodiments, the splice holder 206a is positioned toward the opening edge of the hinged cover 102.

Similarly, the hinged separator 1302 includes an opening edge and a pivoting edge that oppose the corresponding parts of the hinged cover 102. More specifically, as illustrated in FIG. 13, the hinged separator 1302 may have a hinged edge toward the back side of the multi-layer module 100 and an opening edge toward the adapter side of the multi-layer module 100.

Figure 14:
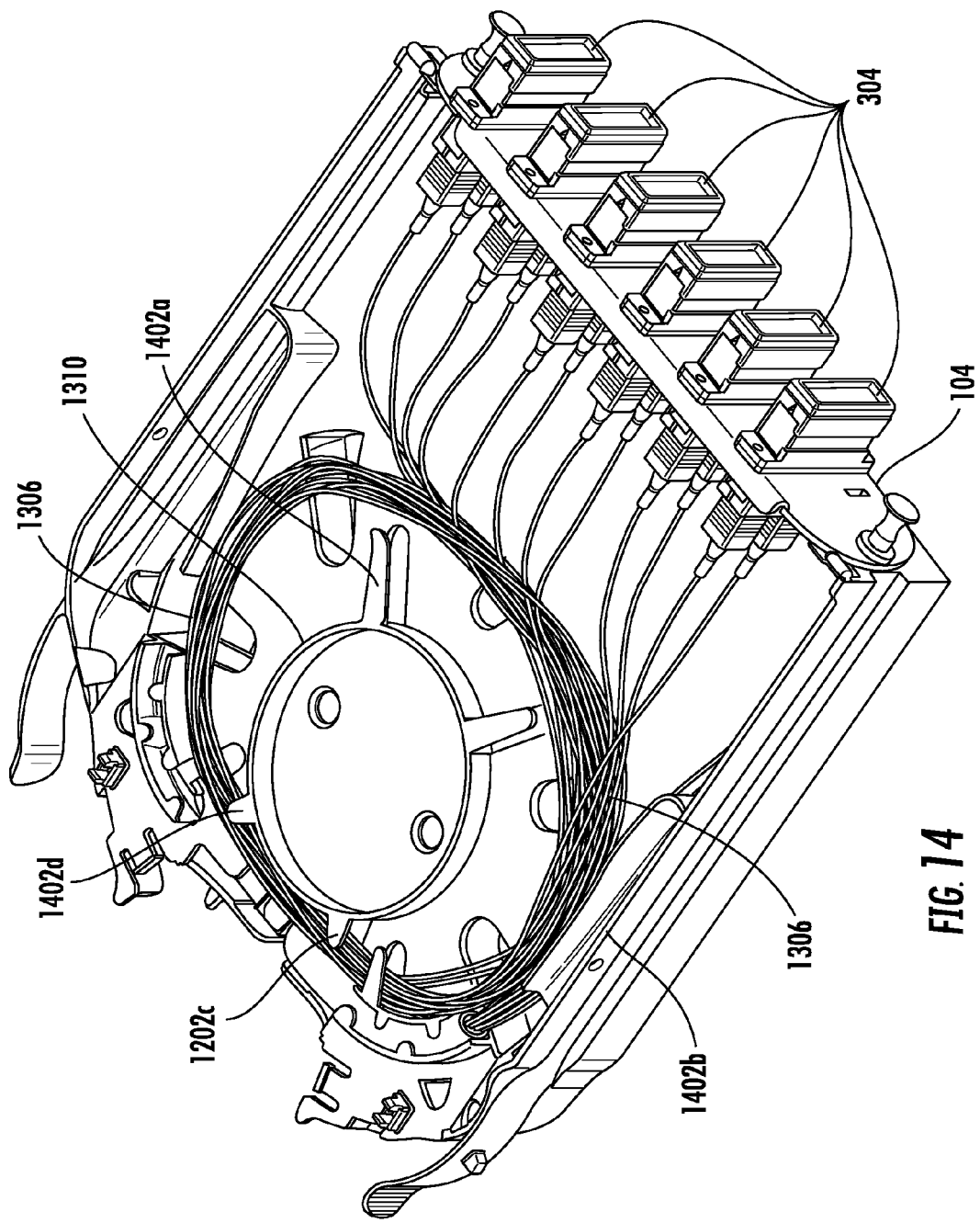
FIG. 14 depicts the pigtail storage layer with the cover and hinged separator removed, further illustrating radius limiting securing mechanisms.

FIG. 14 depicts the pigtail storage layer 208, further illustrating radius limiting securing mechanisms 1402a-1402d. As illustrated, the optical fibers 1306 may be received from the splice storage layer and routed around a pigtail storage area and then to a pigtail connection area for connecting with the adapters 304. Additionally, the radius limiting hub 1310 may be configured to limit a winding radius of the optical fibers. Accordingly, the radius limiting hub 1310 may also include the radius limiting securing mechanisms 1402a-1402d that restrict movement of the optical fibers 1306, when the adapter plate 104 is removed.

Figure 15:
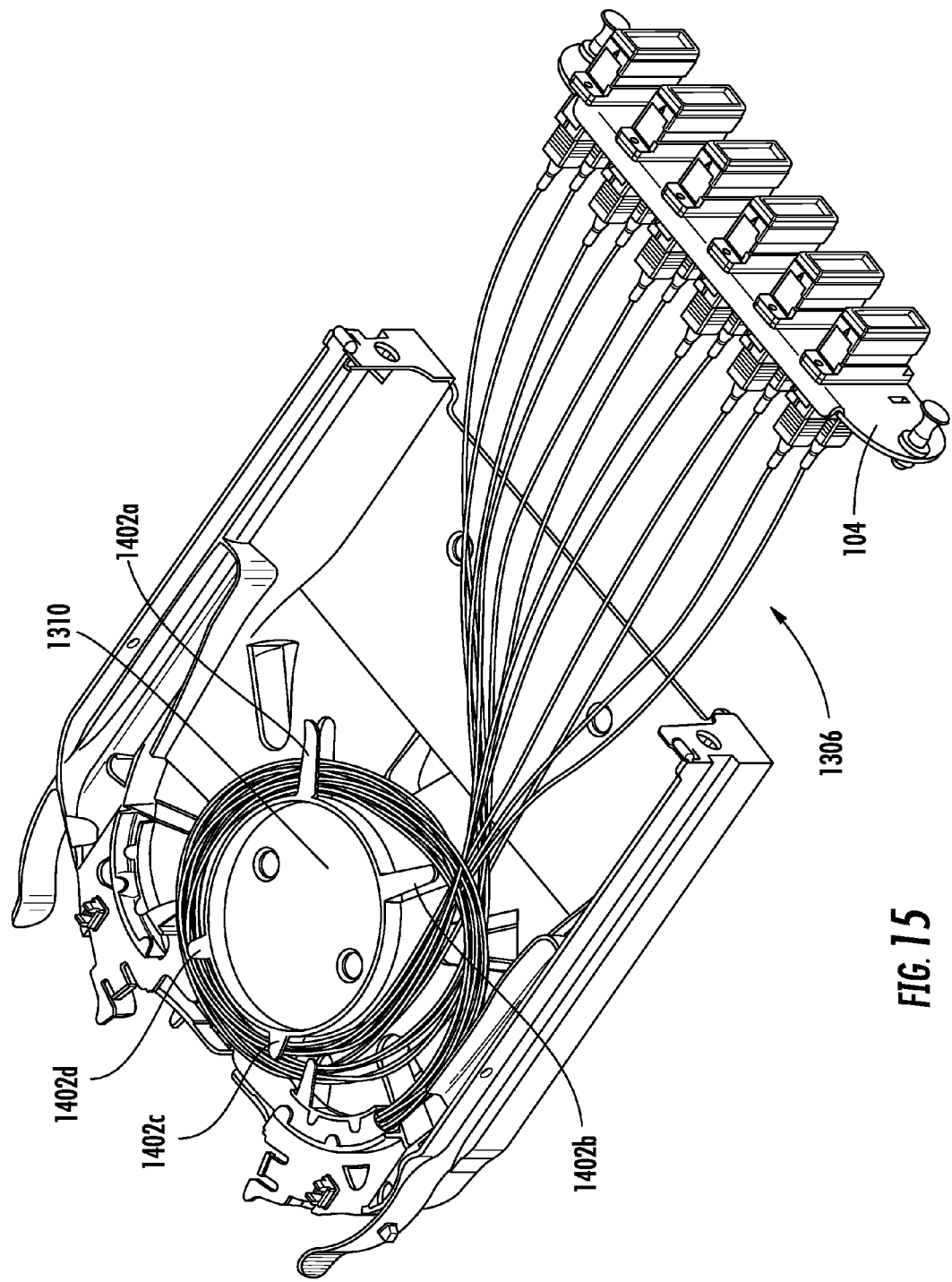
FIG. 15 depicts a portion of the pigtail storage layer, further illustrating removal of the adapter plate.

FIG. 15 depicts the pigtail storage layer 208, further illustrating removal of the adapter plate 104 from the front. As illustrated, upon removal of the adapter plate 104, the optical fibers 1306 are straightened, thereby removing slack from the pigtail storage area. As such, the radius limiting hub 1310 and the radius limiting securing mechanisms 1402a-1402d prevent the optical fibers 1306 from damage by limiting the radius of winding.

Figure 16:
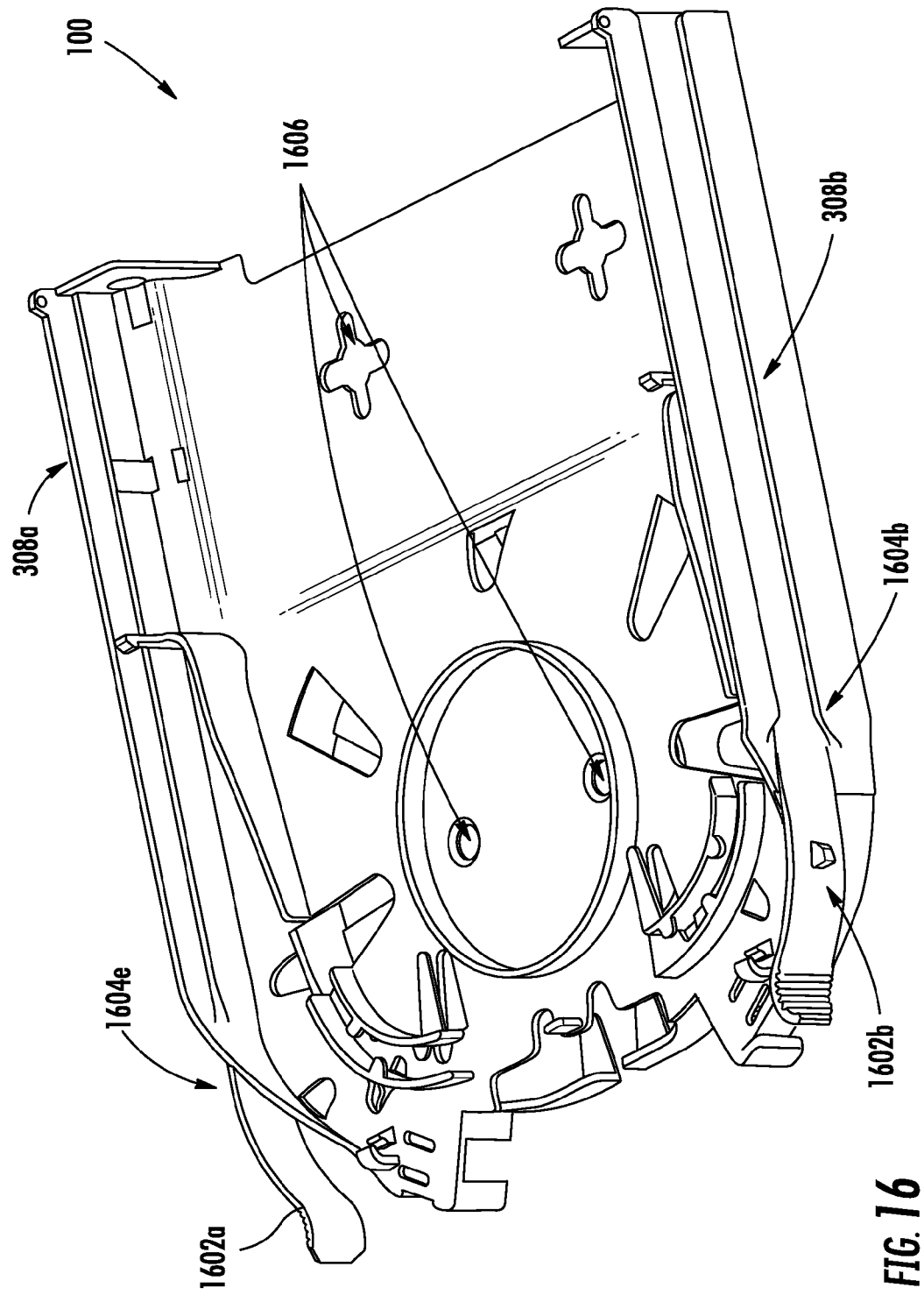
FIG. 16 depicts the portion of the multi-layer splice module, further illustrating the mounting tracks on the sides.

FIG. 16 depicts the portion of the multi-layer module 100, further illustrating the mounting tracks 308a, 308b, according to embodiments disclosed herein. As illustrated, the mounting tracks 308a, 308b may engage with a telecommunications housing or the like for securing the multi-fiber splice module 100 therein. Additionally, the mounting tracks 308a, 308b may include a plurality of respective securing latches 1604a, 1604b for securing the multi-layer module 100 in place. Pull tabs 1602a, 1602b may also be included for removing the multi-layer module 100 from the telecommunications rack. Also included are wall mounting openings 1606 for mounting the multi-layer module 100 to a wall or other structure.

Figure 17:
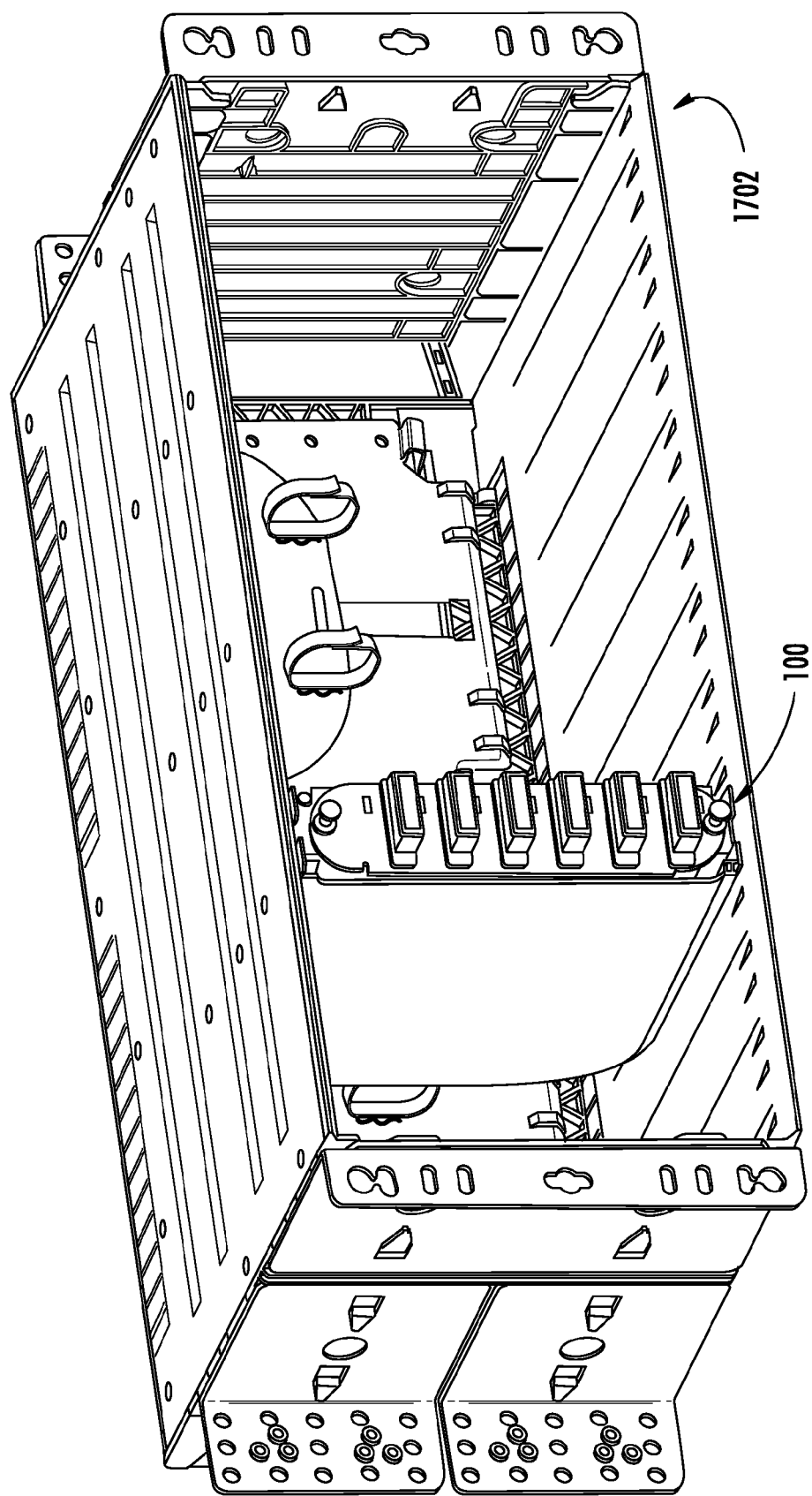
FIG. 17 depicts a perspective environmental view of a telecommunications housing for receiving multi-layer splice modules therein.

FIG. 17 depicts an optical cable system that includes telecommunications housing 1702 for inserting the multi-layer module 100 into an opening on a front side of the telecommunications housing 1702. As illustrated, the mounting tracks 308a, 308b may engage with a corresponding portion of the telecommunications housing 1702 to removably secure the multi-layer module 100. More specifically, the telecommunications housing 1702 may be configured with corresponding tracks to engage with the mounting tracks 302a, 308b for a removably secure configuration. As described above, the multi-layer module 100 may be removed via depressing the pull tabs 1602a, 1602b (FIG. 16). Although telecommunications housing 1702 is illustrated in FIG. 17, other module receiving devices may also be utilized for removably securing the multi-layer splice module and/or at least one other mountable modules in a stackable fashion, where a pair of major faces from the rack mountable optical module is physically disposed against a major face from the at least one other rack mountable module. Module 100 is also advantageous since it has the flexibility for other mounting arrangements. By way of example, module 100 may be secured directly to a mounting surface using fasteners through the cross-shaped openings shown (not numbered) in FIG. 16. This mounting flexibility along with having multi cable entry locations at the front and/or rear allows the craft to use modules disclosed herein in a multitude of arrangement; rather, than being limited in mounting arrangement and/or cable entry as with conventional modules.

For purposes of describing and defining the invention, the phrase "rack mountable optical module" is used herein to identify a fiber-optic module that is configured for removable mounting in a telecommunications rack and defines open or closed stackable major faces that are amenable to relatively compact side-by-side alignment with similar modules within the rack. It should be understood that a "rack mountable optical module" is not to be confused with an outside-rated, stand-alone closure that is provided with a relatively bulky exterior housing designed with exterior-rated moisture seals to withstand the elements for an extended period of outdoor use.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A multi-layer module comprising:
   a multi-fiber cable storage layer having a cable winding structure;
   a splice storage layer that is discrete from the multi-fiber cable storage layer, the splice storage layer having a splice layer receiving opening in communication with the multi-fiber cable storage layer, and a slack storage area having a splice holder seat with a footprint area for removably securing a splice holder; and
   a pigtail storage layer that is discrete from both the multi-fiber cable storage layer and the splice storage layer having a pigtail connector area and a pigtail storage area, the pigtail storage layer comprising a pigtail storage layer receiving opening in communication with the splice storage layer,
   wherein the multi-fiber cable storage layer, the splice storage layer, and the pigtail storage layer are layered such that a portion of the pigtail storage area of the pigtail storage layer is disposed in an intervening space between the multi-fiber cable storage layer and the splice storage layer, while a portion of the pigtail connector area of the pigtail storage layer is disposed outside of the intervening space between the multi-fiber cable storage layer and the splice storage layer.

2. The multi-layer module of claim 1, further comprising an adapter plate positioned in an adapter opening and removably connected to the multi-layer module.

3. The multi-layer module, of claim 1, further comprising a hinged cover having a closed position and an open position, wherein in the closed position, the hinged cover covers at least a portion of the splice storage layer, and in the open position the hinged cover provides access to at least a portion of the splice storage layer.

4. The multi-layer module of claim 3, further comprising a hinged separator having a closed position and an open position, wherein in the closed position, the hinged separator separates the splice storage layer from the pigtail storage layer and in the open position the hinged separator provides access to the pigtail storage layer.

5. The multi-layer module of claim 4, wherein the hinged cover and the hinged separator define opposing hinges and overlapping access fields in the multi-layer module.

6. The multi-layer module of claim 4, wherein the hinged cover and the hinged separator are configured relative to each other such that the hinged cover is transitioned from the closed position to the open position to permit the hinged separator to be transitioned from the closed position to the open position.

7. A multi-layer module comprising:
   a multi-fiber cable storage layer having a cable entry opening and a cable winding structure;
   a splice storage layer that is discrete from the multi-fiber cable storage layer, the splice storage layer comprising a slack storage area and a splice holder, the slack storage area having a splice holder seat with a footprint area for removably securing the splice holder; and
   a pigtail storage layer that is discrete from both the multi-fiber cable storage layer and the splice storage layer, the pigtail storage layer comprising a pigtail storage area and pigtail connector area, the pigtail storage area in communication with the splice storage layer,
   wherein the multi-fiber cable storage layer, the splice storage layer, and the pigtail storage layer are layered such that a portion of the pigtail storage area of the pigtail storage layer is disposed in an intervening space between the multi-fiber cable storage layer and the splice storage layer, while a portion of the pigtail connector area of the pigtail storage layer is disposed outside of the intervening space between the multi-fiber cable storage layer and the splice storage layer.

* * * * *